United States Patent
Saito et al.

(10) Patent No.: US 8,898,666 B2
(45) Date of Patent: Nov. 25, 2014

(54) VIRTUAL MACHINE SYSTEM AND VIRTUAL MACHINE SYSTEM CONTROL METHOD FOR CONTROLLING PROGRAM EXECUTION ON A PLURALITY OF PROCESSORS THAT HAVE A PLURALITY OF PRIVILEGED MODES

(75) Inventors: Masahiko Saito, Osaka (JP); Teruto Hirota, Osaka (JP); Hiroo Ishikawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 228 days.

(21) Appl. No.: 13/577,311

(22) PCT Filed: Sep. 7, 2011

(86) PCT No.: PCT/JP2011/005019
§ 371 (c)(1),
(2), (4) Date: Aug. 6, 2012

(87) PCT Pub. No.: WO2012/086106
PCT Pub. Date: Jun. 28, 2012

(65) Prior Publication Data
US 2012/0331464 A1 Dec. 27, 2012

(30) Foreign Application Priority Data
Dec. 21, 2010 (JP) ................................. 2010-284490

(51) Int. Cl.
*G06F 9/455* (2006.01)
*G06F 9/50* (2006.01)
*G06F 21/74* (2013.01)

(52) U.S. Cl.
CPC .......... *G06F 9/5077* (2013.01); *G06F 9/45533* (2013.01); *G06F 21/74* (2013.01); *G06F 2009/45587* (2013.01)
USPC .............................................. 718/1; 718/108

(58) Field of Classification Search
None
See application file for complete search history.

(56) References Cited

U.S. PATENT DOCUMENTS 6,496,847 B1 * 12/2002 Bugnion et al. ................ 718/1
7,434,003 B2 * 10/2008 Oney et al. ................... 711/135
(Continued)

FOREIGN PATENT DOCUMENTS

| CA | 1015063 | 8/1977 |
| JP | 50-23146 | 3/1975 |

(Continued)

OTHER PUBLICATIONS

International Search Report issued Oct. 25, 2011 in corresponding International Application No. PCT/JP2011/005019.

(Continued)

*Primary Examiner* — Van Nguyen
(74) *Attorney, Agent, or Firm* — Wenderoth, Lind & Ponack, L.L.P.

(57) ABSTRACT

A virtual machine system is provided with a processor having only two privileged modes, a low privileged mode and a high privileged mode, and achieves both a security function for protecting digital copyrighted works or the like and an operating system switching function that guarantees system reliability. The virtual machine system is provided with a first and a second processor and executes a hypervisor on the first processor in the high privileged mode. An operating system on the second processor is executed by cooperation between the hypervisor running on the first processor and a program running on the second processor in low privileged mode. This eliminates the need for running the hypervisor on the second processor in the high privileged mode, thus allowing for execution on the second processor in the high privileged mode of a program for implementing the security function.

10 Claims, 17 Drawing Sheets

(56) References Cited

U.S. PATENT DOCUMENTS

| | | | |
|---|---|---|---|
| 7,503,049 B2* | 3/2009 | Kanemura et al. | 718/108 |
| 7,788,487 B2* | 8/2010 | Ito et al. | 713/164 |
| 7,810,096 B2* | 10/2010 | Saito et al. | 718/103 |
| 7,904,903 B2* | 3/2011 | Grobman et al. | 718/1 |
| 7,996,663 B2* | 8/2011 | Stillwell et al. | 712/244 |
| 8,219,990 B2* | 7/2012 | Khanna | 718/1 |
| 8,266,629 B2* | 9/2012 | Inoue et al. | 718/108 |
| 8,296,775 B2* | 10/2012 | Thornton et al. | 718/108 |
| 8,413,146 B1* | 4/2013 | McCorkendale et al. | 718/1 |
| 8,468,533 B2* | 6/2013 | Miyazaki et al. | 718/103 |
| 8,489,862 B2* | 7/2013 | Saito et al. | 712/43 |
| 2002/0194389 A1 | 12/2002 | Worley, Jr. et al. | |
| 2007/0106986 A1 | 5/2007 | Worley, Jr. | |
| 2010/0185833 A1* | 7/2010 | Saito et al. | 712/203 |

FOREIGN PATENT DOCUMENTS

| | | |
|---|---|---|
| JP | 4-213733 | 8/1992 |
| JP | 2004-234114 | 8/2004 |
| JP | 2004-537786 | 12/2004 |
| JP | 2006-99333 | 4/2006 |
| JP | 2009-514104 | 4/2009 |

OTHER PUBLICATIONS

"Informal Comments" filed in response to the Written Opinion issued Oct. 25, 2011 in International Application No. PCT/JP2011/005019 (with English translation).

* cited by examiner

VIRTUAL MACHINE SYSTEM AND VIRTUAL MACHINE SYSTEM CONTROL METHOD FOR CONTROLLING PROGRAM EXECUTION ON A PLURALITY OF PROCESSORS THAT HAVE A PLURALITY OF PRIVILEGED MODES

TECHNICAL FIELD

The present invention relates to a virtual machine system provided with a plurality of processors and more particularly to a technique for controlling program execution on a plurality of processors that have a plurality of privileged modes.

BACKGROUND ART

In a conventionally known virtual machine system, a plurality of operating systems run alternately on a processor by time sharing.

Such a virtual machine system includes a hypervisor for causing a processor to execute processing to control the switching between operating systems.

In order to guarantee reliability of the system, it is necessary for the hypervisor to execute the processing to control the switching between operating systems, which run in a privileged mode, at a higher privileged mode than the operating systems.

For example, in the virtual machine system shown in Patent Literature 1, the processor constituting the virtual machine system includes the privileged modes of supervisor mode and hypervisor mode, which is higher than supervisor mode. The operating systems run in supervisor mode, whereas the hypervisor runs in hypervisor mode.

In a virtual machine system that handles confidential data, however, it is preferable from a security perspective for the confidential data to be protected from access by programs other than a program designated as being reliable (hereinafter referred to as a "secure program").

Such a virtual machine system thus requires a privileged mode for running the secure program other than the supervisor mode and the hypervisor mode.

For example, Patent Literature 2 discloses a virtual machine system in which the processor constituting the virtual machine system is provided with a secure mode that is a privileged mode at an even higher level than the hypervisor mode. The secure program runs in the secure mode.

FIG. 16 shows the operation modes of the processor constituting the virtual machine system in Patent Literature 2.

As shown in FIG. 16, the processor constituting the virtual machine system is provided with three privileged modes in addition to a user mode 1640, namely a supervisor mode 1630, a hypervisor mode 1620, and a secure mode 1610. Application programs run in the user mode 1640, the operating systems run in the supervisor mode 1630, the hypervisor runs in the hypervisor mode 1620, and the secure program runs in the secure mode 1610.

CITATION LIST

Patent Literature

Patent Literature 1: Japanese Patent Application Publication No. S50-23146
Patent Literature 2: Japanese Patent Application Publication No. 2004-537786

SUMMARY OF INVENTION

Technical Problem

Processors provided with three or more privileged modes in addition to the user mode, however, are generally high performance processors. Compared to processors provided with only two privileged modes, such high performance processors have high power consumption and are often expensive.

The present invention has been conceived in light of the above problems, and it is an object thereof to provide a virtual machine system that achieves both an operating system switching function that guarantees system reliability and a security protection function that uses a secure program, even if the processor of the virtual machine system is only provided with two privileged modes.

Solution to Problem

In order to solve the above problems, a virtual machine system according to the present invention comprises: a memory including an execution state storage region for storing execution state information on an execution state of a processor; a first processor and a second processor each connected to the memory and provided with a low privileged mode and a high privileged mode higher than the low privileged mode; one or more operating systems running in the low privileged mode on a processor; a hypervisor, running in the high privileged mode on the first processor, configured to cause the first processor to perform processing for switching the operating system by saving and restoring execution state information in the execution state storage region, and to provide the second processor with restoration notification based on the execution state information saved in the execution state storage region; and a restoration program, running in the low privileged mode on the second processor, configured to cause the second processor to restore the execution state information stored in the execution state storage region to the execution state information of the second processor upon receipt by the second processor of the restoration notification.

Advantageous Effects of Invention

With the above structure, the virtual machine system according to the present invention can transfer an operating system targeted for switching by the first processor to the second processor and execute the operating system on the second processor, even if no hypervisor is running on the second processor in the high privileged mode.

As a result, the high privileged mode of the second processor can be used as a secure mode for executing a secure program.

Therefore, even though the first processor and the second processor in the virtual machine system only have two privileged modes, the virtual machine system can achieve both an operating system switching function that guarantees system reliability and a security protection function that uses a secure program.

DESCRIPTION OF EMBODIMENTS

Embodiment 1

Outline

As an embodiment of a virtual machine system according to the present invention, the following describes a virtual machine system that is provided with a first processor and a second processor and that executes a plurality of operating systems using these processors.

The first processor and the second processor in the virtual machine system are each provided with two privileged modes: a supervisor mode, and a hypervisor/secure mode that is at a higher level than the supervisor mode.

The hypervisor/secure mode in the first processor is used for running a hypervisor that causes the first processor to execute processing to switch between operating systems running in the supervisor mode. Therefore, the secure program for implementing a secure function is not executed in the hypervisor/secure mode of the first processor.

By contrast, the hypervisor/secure mode of the second processor is not used for running a hypervisor, but rather for running the secure program. Therefore, a hypervisor is not executed in the hypervisor/secure mode of the second processor.

The virtual machine system also has a function to decrypt an encrypted digital copyrighted work using an encryption key that is to be kept confidential from the user of the virtual machine system.

With reference to the drawings, the following describes the structure of a virtual machine system according to Embodiment 1.

Hardware Structure

Figure 1:
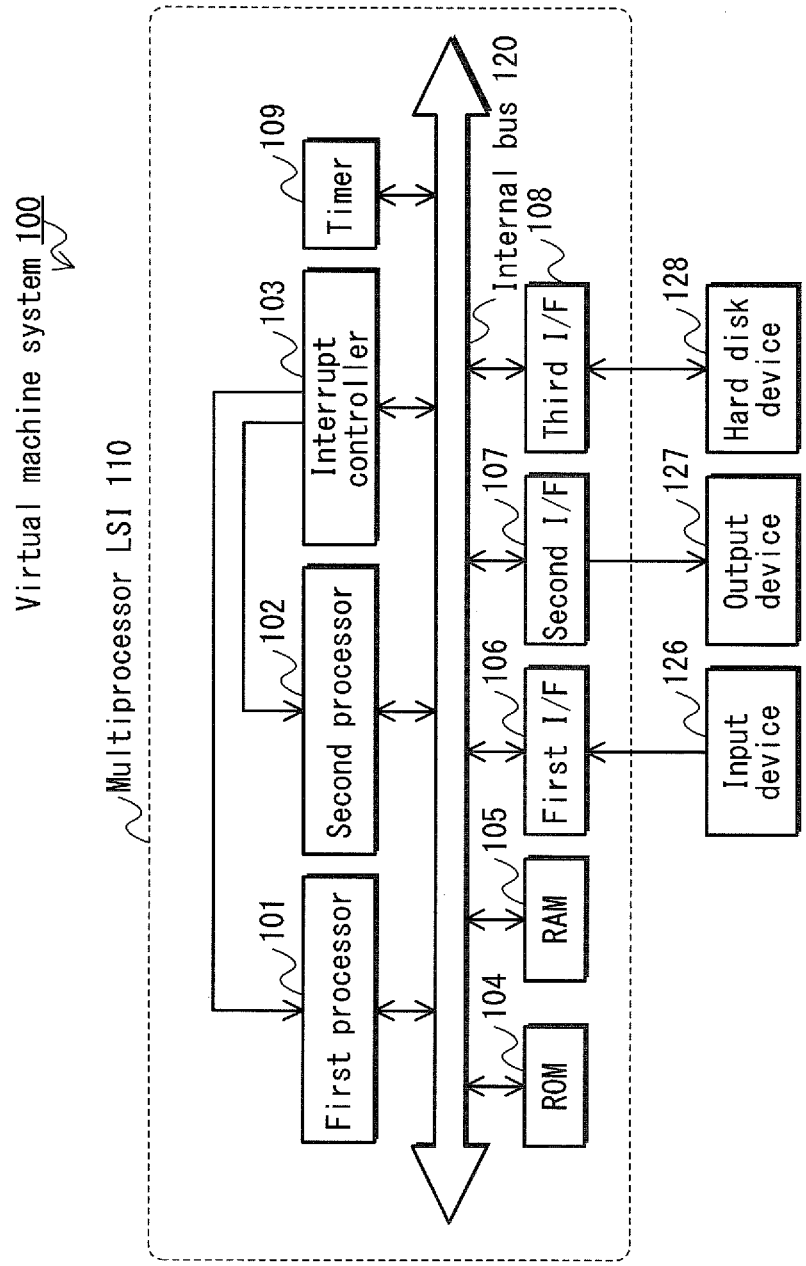
FIG. 1 is a block diagram illustrating the main hardware structure of a virtual machine system 100.

FIG. 1 is a block diagram illustrating the main hardware structure of a virtual machine system 100.

As shown in FIG. 1, the hardware of the virtual machine system 100 is a computer device that includes a multiprocessor LSI (Large Scale Integration) 110, a hard disk device 128, an output device 127, and an input device 126.

The multiprocessor LSI 110 is an integrated circuit in which are integrated the following: a first processor 101, a second processor 102, an interrupt controller 103, a ROM (Read Only Memory) 104, a RAM (Random Access Memory) 105, a first interface 106, a second interface 107, a third interface 108, a timer 109, and an internal bus 120. The multiprocessor LSI 110 is connected to the input device 126, the output device 127, and the hard disk device 128.

The first processor 101 and the second processor 102 are the same type of processor and are each connected to the internal bus 120 and the interrupt controller 103. The first processor 101 and the second processor 102 both achieve a variety of functions by controlling the ROM 104, the RAM 105, the timer 109, the input device 126, the output device 127, and the hard disk device 128 by executing programs stored in the ROM 104 and the RAM 105.

Figure 2:
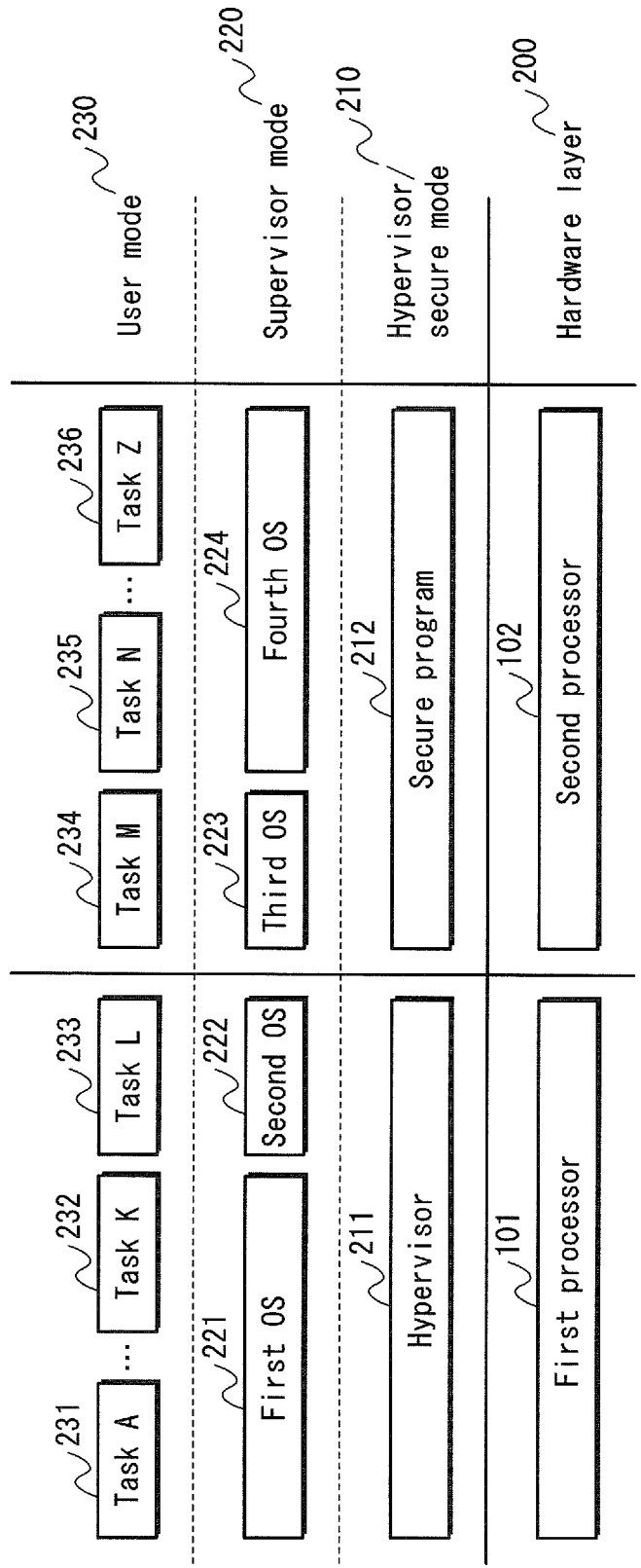
FIG. 2 illustrates operation modes with which a first processor 101 and a second processor 102 are provided.

FIG. 2 illustrates operation modes with which the first processor 101 and the second processor 102 are provided.

As shown in FIG. 2, the first processor 101 and the second processor 102 are provided with a user mode 230 for running application programs, a higher level privileged mode, hereinafter referred to as a "supervisor mode 220", and an even higher level privileged mode than the supervisor mode 220, hereinafter referred to as a "hypervisor/secure mode 210".

The first processor 101 runs application programs (in FIG. 2, task A 231, task K 232, task L 233, and the like) in the user mode 230, runs the operating systems (in FIG. 2, the first OS 221 and the second OS 222) in the supervisor mode 220, and runs a hypervisor 211 in the hypervisor/secure mode 210.

The second processor 102 runs application programs (in FIG. 2, task M 234, task N 235, task Z 236, and the like) in the user mode 230, runs the operating systems (in FIG. 2, the third OS 223 and the fourth OS 224) in the supervisor mode 220, and runs a secure program 212 in the hypervisor/secure mode 210.

The secure program 212 is a program composed of processing code for decryption using an encryption key stored in the ROM 104.

The first processor 101 is set so that in hypervisor/secure mode 210, the first processor 101 can access the memory region in which the hypervisor 211 is stored yet cannot access the memory region in which the secure program 212 is stored.

By contrast, the second processor 102 is set so that in hypervisor/secure mode 210, the second processor 102 can access the memory region in which the secure program 212 is stored yet cannot access the memory region in which the hypervisor 211 is stored.

The second processor 102 has a function to enter a wait state by executing an instruction to enter a wait state.

The wait state of the processor refers to a state in which the processor suspends calculation and does not execute the next instruction until receiving an interrupt from the interrupt controller 103. The processor is released from the wait state upon receipt of an interrupt from the interrupt controller 103. The second processor 102 is set to execute, upon release from the wait state, a program that sets a starting address to be an address stored in a restart pointer storage region 342 (described below).

Returning again to FIG. 1, description of the structure of the virtual machine system 100 continues.

The interrupt controller 103 is connected to the internal bus 120, the first processor 101, and the second processor 102. The interrupt controller 103 has a function to receive an interrupt for the first processor 101 via the internal bus 120 and to notify the first processor 101 of the interrupt, and a function to receive an interrupt for the second processor 102 via the internal bus 120 and to notify the second processor 102 of the interrupt.

The ROM 104 is connected to the internal bus 120 and stores programs regulating the operations of the first processor 101 and the second processor 102, as well as data used by the first processor 101 and the second processor 102.

Memory regions of the ROM 104 are shared by the first processor 101 and the second processor 102. The ROM 104 includes, however, a region that is set so that access thereto is limited to the second processor 102 in the hypervisor/secure mode. Data that is to be kept confidential from the user of the virtual machine system 100 is stored in this region. An example of such data is an encryption key for decrypting an encrypted digital copyrighted work.

The RAM 105 is connected to the internal bus 120 and stores programs regulating the operations of the first processor 101 and the second processor 102, as well as data used by the first processor 101 and the second processor 102.

Memory regions of the RAM 105 are shared by the first processor 101 and the second processor 102. The RAM 105 includes, however, a region that is set so that access thereto is limited to the first processor 101 in the hypervisor/secure mode, a region that is set so that access thereto is limited to the second processor 102 in the hypervisor/secure mode, and a region that is set so that access thereto is limited to a processor in the hypervisor/secure mode or the supervisor mode.

The first interface 106, the second interface 107, and the third interface 108 are each connected to the internal bus 120 and respectively have a function to act as an interface for the exchange of signals between the internal bus 120 and the input device 126, between the internal bus 120 and the output device 127, and between the internal bus 120 and the hard disk device 128.

The timer 109 is connected to the internal bus 120 and is controlled by the first processor 101 and by the second processor 102.

The internal bus 120 is connected to the first processor 101, the second processor 102, the interrupt controller 103, the ROM 104, the RAM 105, the first interface 106, the second interface 107, the third interface 108, and the timer 109 and has a function to transmit signals between these circuits.

The input device 126 includes a keyboard, a mouse, and the like, is connected to the first interface 106, and is controlled by the first processor 101 and the second processor 102. The input device 126 has a function to accept input of commands from the user via the keyboard, the mouse, and the like, and to transmit the received commands to the first processor 101 and the second processor 102.

The output device 127 has an internal display, speaker, and the like, is connected to the second interface 107, and is controlled by the first processor 101 and the second processor 102. The output device 127 has a function to display/output character sequences, images, audio, and so forth via the internal display, speaker, and the like.

The hard disk device 128 has an internal hard disk, is connected to the third interface 108, and is controlled by the first processor 101 and the second processor 102. The hard disk device 128 has a function to write data to the internal hard disk and a function to read data written on the internal hard disk.

Data for an encrypted digital copyrighted work, programs executed by the first processor 101 and the second processor 102, and other such data is written on the hard disk internal to the hard disk device 128.

In the virtual machine system 100, the first processor 101 and the second processor 102 achieve a variety of functions by executing programs stored in the ROM 104 and the RAM 105.

Program Module Structure

Figure 3:
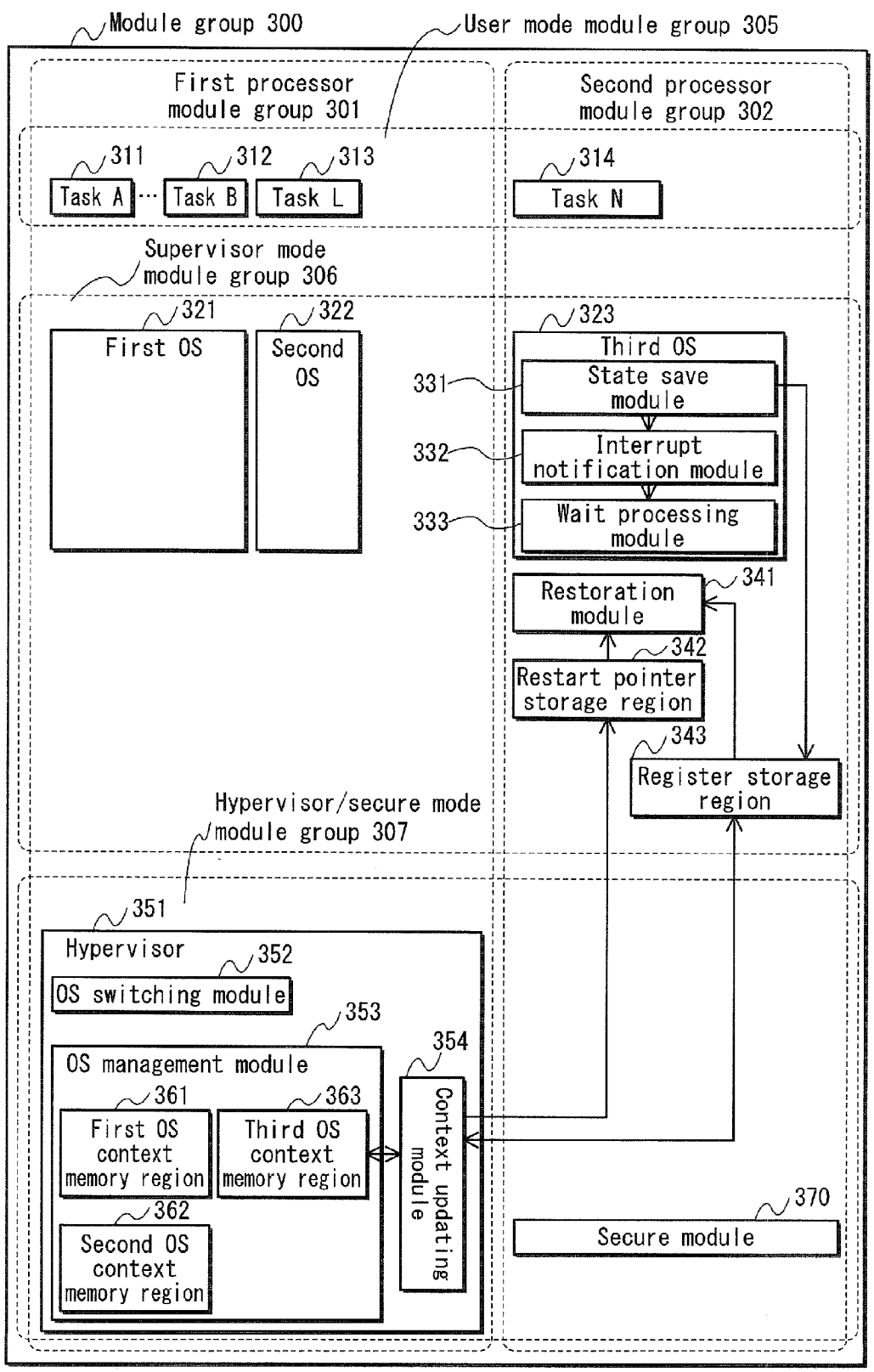
FIG. 3 is a block diagram illustrating program modules running on a multiprocessor LSI 110.

FIG. 3 is a block diagram illustrating program modules (hereinafter simply referred to as "modules") that are to be executed on the multiprocessor LSI 110 at a given time t0.

As shown in FIG. 3, a module group 300 is a group of modules to be executed by either the first processor 101 or the second processor 102. Programs corresponding to the modules included in the module group 300 are stored in memory regions of the ROM 104 and the RAM 105.

A first processor module group 301 is a group of modules to be executed on the first processor 101.

A second processor module group 302 is a group of modules to be executed on the second processor 102.

A user mode module group 305 is a group of modules to be executed by a processor in user mode.

A supervisor mode module group 306 is a group of modules to be executed by a processor in supervisor mode.

A hypervisor/secure mode module group 307 is a group of modules to be executed by a processor in hypervisor/secure mode.

In the virtual machine system 100, application programs are executed in user mode, and execution thereof is controlled by multitask operating systems running in supervisor mode. The operating systems are executed in supervisor mode, and execution thereof is controlled by a hypervisor running in hypervisor/secure mode.

The application programs can issue a request for processing to an operating system by invoking an operating system call routine that is prepared in advance. The operating systems can issue a request for processing to the hypervisor by invoking a hypervisor call routine that is prepared in advance.

Task A 311 through task B 312, task L 313, and task N 314 are all modules executed by a processor in user mode.

Among these tasks, task A 311 through task B 312, as well as task L 313, are modules to be executed by the first processor 101. Task N 314 is a module to be executed by the second processor 102.

A register storage region 343 is a portion of the memory region of the RAM 105. The register storage region 343 stores register values of a processor and is set to be accessible only by modules running on a processor in a privileged mode of at least the supervisor mode.

A restart pointer storage region 342 is a portion of the memory region of the RAM 105. The restart pointer storage region 342 stores a pointer to the starting address of a module and is set to be accessible only by modules running on a processor in a privileged mode of at least the supervisor mode.

A restoration module 341 is a module running on the second processor 102 in supervisor mode and has a function to restore the values stored in the register storage region 343 into the register of the second processor 102.

A first OS 321, a second OS 322, and a third OS 323 are multitask operating systems that run independently of each other. Each of these operating systems runs on a processor in supervisor mode.

Among these operating systems, the first OS 321 and the second OS 322 run on the first processor 101, whereas the third OS 323 runs on the second processor 102.

The first OS 321 controls execution of task A 311 through task B 312. The second OS 322 controls execution of task L 313. The third OS controls execution of task N 314.

Furthermore, the third OS 323 internally includes a state save module 331, an interrupt notification module 332, and a wait processing module 333.

The state save module 331 has a function such that, while the OS that includes the state save module 331 is running on the second processor 102, upon invocation of a call routine of a hypervisor 351 (described below) due to a request by a task whose execution is controlled by the OS that includes the state save module 331, the state save module 331 suspends execution of the task with an instruction immediately after the invocation of the call routine and saves register values of the processor on which the state save module 331 is running in the register storage region 343.

The interrupt notification module 332 has a function to notify the first processor 101 of an interrupt, using the interrupt controller 103, when the state save module 331 saves register values in the register storage region 343.

The wait processing module 333 has a function to set the second processor 102 to a wait state when the interrupt notification module 332 notifies the first processor 101 of an interrupt.

The hypervisor 351 operates on the first processor 101 in hypervisor/supervisor mode and has a function to control execution of a plurality of operating systems by time sharing via the timer 109.

The hypervisor 351 internally includes an OS switching module 352, an OS management module 353, and a context updating module 354.

The OS management module 353 internally includes a first OS context memory region 361, a second OS context memory region 362, and a third OS context memory region 363. The OS management module 353 has a function to store, in these memory regions, the register values of a processor and a function to read, from these memory regions, the register values of a processor.

The first OS context memory region 361 is a portion of the memory region of the RAM 105 for storing register values when the processor whose register values are to be stored is executing the first OS 321. The first OS context memory region 361 is set to be accessible only by a module running on the first processor in hypervisor/secure mode.

The second OS context memory region 362 is a portion of the memory region of the RAM 105 for storing register values when the processor whose register values are to be stored is executing the second OS 322. The second OS context memory region 362 is set to be accessible only by a module running on the first processor in hypervisor/secure mode.

The third OS context memory region 363 is a portion of the memory region of the RAM 105 for storing register values when the processor whose register values are to be stored is executing the third OS 323. The third OS context memory region 363 is set to be accessible only by a module running on the first processor in hypervisor/secure mode.

The OS switching module 352 has a function to store the operating systems whose execution is controlled, as well as a time sharing execution control function to measure elapsed time using the timer 109 and, so that the maximum time of a time slice is a predetermined time T1 (for example, 10 ms), suspend tasks running on the first processor 101 and stop the operating system, use the OS management module 353 to store the register values of the first processor 101 in the corresponding OS context memory region, use the OS management module 353 to read the register values of another operating system under execution control, and restore the read register values to the register of the first processor 101.

Furthermore, the OS switching module 352 has a function such that, while the third OS 323 is running on the first processor 101, upon termination of a hypervisor call routine that the third OS 323 was requested to invoke by a task whose execution is controlled by the third OS 323, the OS switching module 352 suspends execution of the third OS 323 and the task running on the first processor 101, saves register values of the first processor 101 in the third OS context memory region 363 using the OS management module 353, and notifies the context updating module 354 of termination of the hypervisor call routine.

The context updating module 354 has a function such that, when the first processor 101 receives notification of a hypervisor call interrupt (described below), the context updating module 354 reads the register values of the processor saved in the register storage region 343, stores the read register values in the third OS context memory region 363 using the OS management module 353, and notifies the OS switching module 352 of a signal indicating the addition of the third OS 323 to the operating systems under execution control. The context updating module 354 also has a function such that, upon being notified by the OS switching module 352 of termination of a hypervisor call routine, the context updating module 354 uses the OS management module 353 to read the register values stored in the third OS context memory region 363, stores the read register values in the register storage region 343, writes the starting address of the restoration module 341 in the restart pointer storage region 342, notifies the second processor 102 of a hypervisor call termination interrupt (described below) using the interrupt controller 103, and notifies the OS switching module 352 of a signal indicating the removal of the third OS 323 from the operating systems under execution control.

A secure module 370 is a module that runs on the second processor 102 in hypervisor/supervisor mode and has a function to perform decryption using an encryption key stored in the ROM 104.

With reference to the drawings, the following describes operations of the virtual machine system 100 with the above structure.

Operations

Among operations by the virtual machine system 100, the following describes characteristic operations, namely hypervisor call processing and hypervisor call termination processing.

Hypervisor Call Processing

Hypervisor call processing is processing performed when a task (in this example, task N 314) whose execution is controlled by an operating system running on the second processor 102 (in this example, the third OS 323) requests that the third OS 323 invoke a call routine of the hypervisor 351. The hypervisor call processing suspends execution of the third OS 323 on the second processor 102 and executes the third OS 323 on the first processor 101 instead.

The hypervisor call processing is implemented by the first processor 101 and the second processor 102 in coordination.

Figure 4:
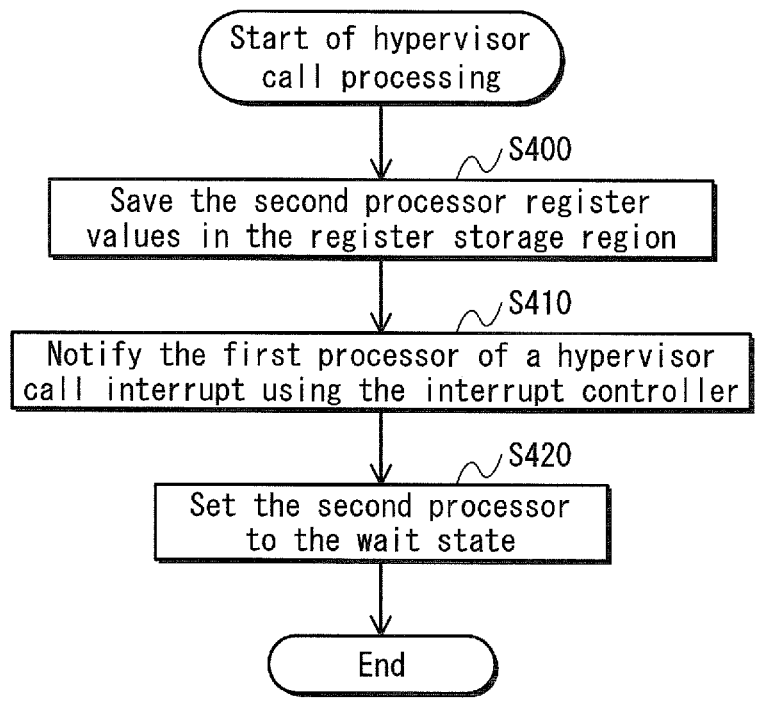
FIG. 4 is a flowchart of processing performed by the second processor 102 during hypervisor call processing.
Figure 5:
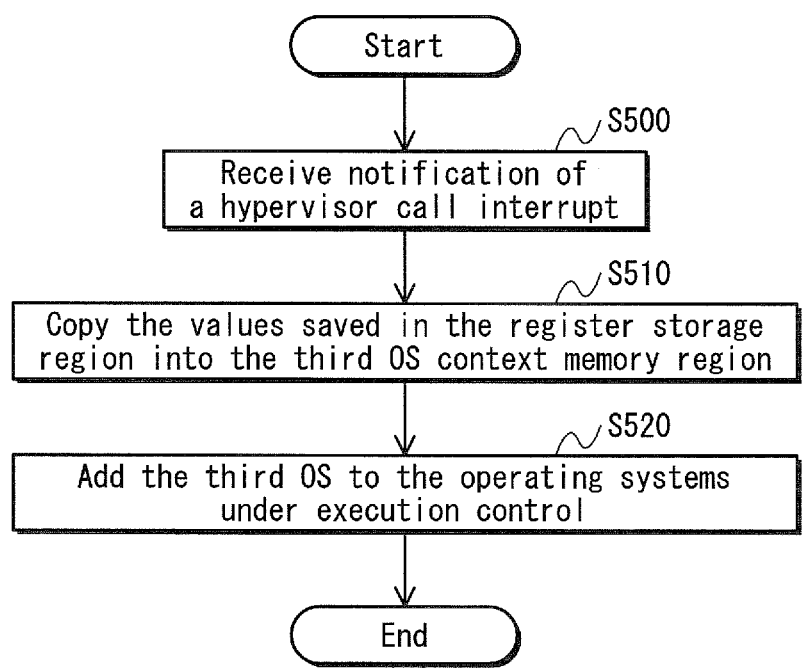
FIG. 5 is a flowchart of processing performed by the first processor 101 during hypervisor call processing.

FIG. 4 is a flowchart of processing performed by the second processor 102 during hypervisor call processing, and FIG. 5 is a flowchart of processing performed by the first processor 101 during hypervisor call processing.

The hypervisor call processing starts when task N 314 issues a request to the third OS 323 to invoke a call routine of the hypervisor 351.

When the call routine of the hypervisor 351 is invoked, the state save module 331 suspends execution of the task with an instruction immediately after the invocation of the call routine and saves register values of the second processor in the register storage region 343 (FIG. 4, step S400).

The interrupt notification module 332 notifies the first processor 101 of a hypervisor call interrupt, using the interrupt controller 103, when the state save module 331 saves the register values in the register storage region 343 (step S410).

The hypervisor call interrupt is an interrupt to notify the first processor 101 that the call routine of the hypervisor 351 has been invoked on the second processor 102.

The wait processing module 333 sets the second processor 102 to a wait state when the interrupt notification module 332 notifies the first processor 101 of the hypervisor call interrupt (step S420).

Completion of the processing in step S420 represents the termination of processing performed by the second processor 102 during the hypervisor call processing.

Once the first processor 101 is notified of the hypervisor call interrupt (FIG. 5, step S500), the context updating module 354 reads the processor register values that are saved in the register storage region 343, stores the read register values in the third OS context memory region 363 using the OS management module 353 (step S510), and notifies the OS switching module 352 of a signal indicating the addition of the third OS 323 to the operating systems under execution control.

Upon receiving, from the context updating module 354, the notification of the signal indicating the addition of the third OS 323 to the operating systems under execution control, the OS switching module 352 adds the third OS 323 to the operating systems under execution control (step S520).

Next, upon completion of the processing in step S520, the first processor 101 terminates the processing performed by the first processor 101 during the hypervisor call processing. The hypervisor call processing thus terminates.

As a result of execution of the above hypervisor call processing, the third OS 323 that was running on the second processor 102 runs on the first processor 101. Accordingly, the third OS 323 can execute a call routine of the hypervisor 351.

Hypervisor Call Termination Processing

While the operating system that has become a target for execution on the first processor 101 (in this example, the third OS 323) is running on the first processor 101 as a result of the hypervisor call processing, the hypervisor call termination processing begins upon termination of processing for the call routine of the hypervisor 351. The hypervisor call termination processing is processing to suspend the third OS 323 running on the first processor 101 and to cause the suspended third OS 323 to run on the second processor 102. The hypervisor call termination processing is implemented by the first processor and the second processor in coordination.

Figure 6:
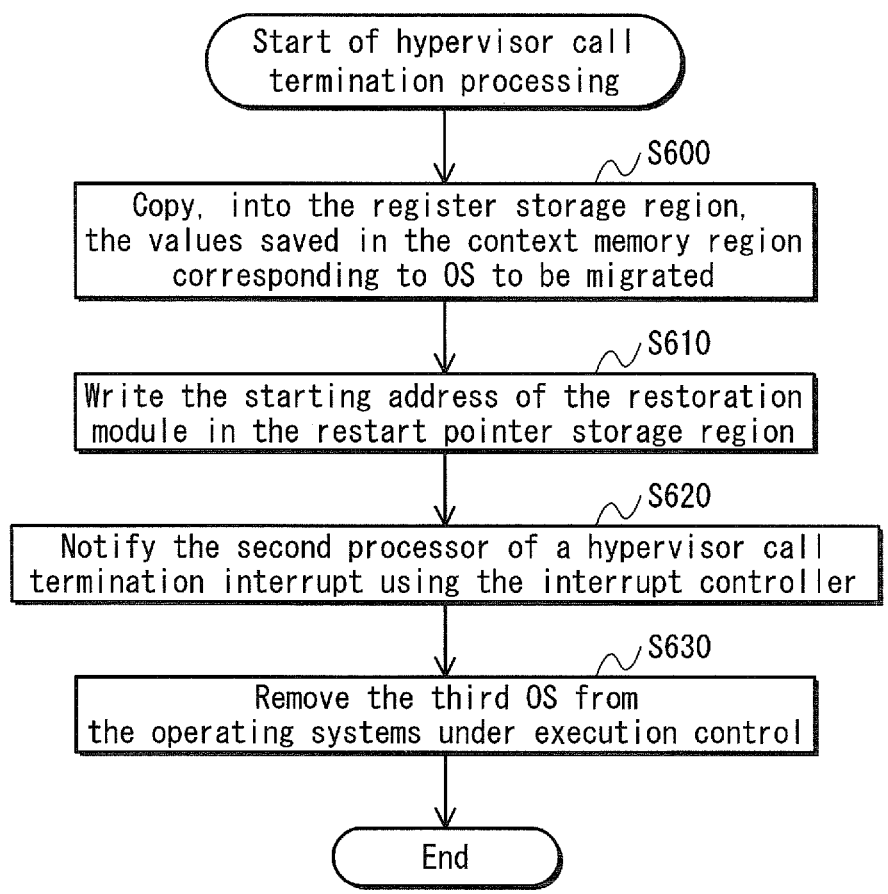
FIG. 6 is a flowchart of processing performed by the first processor 101 during hypervisor call termination processing.
Figure 7:
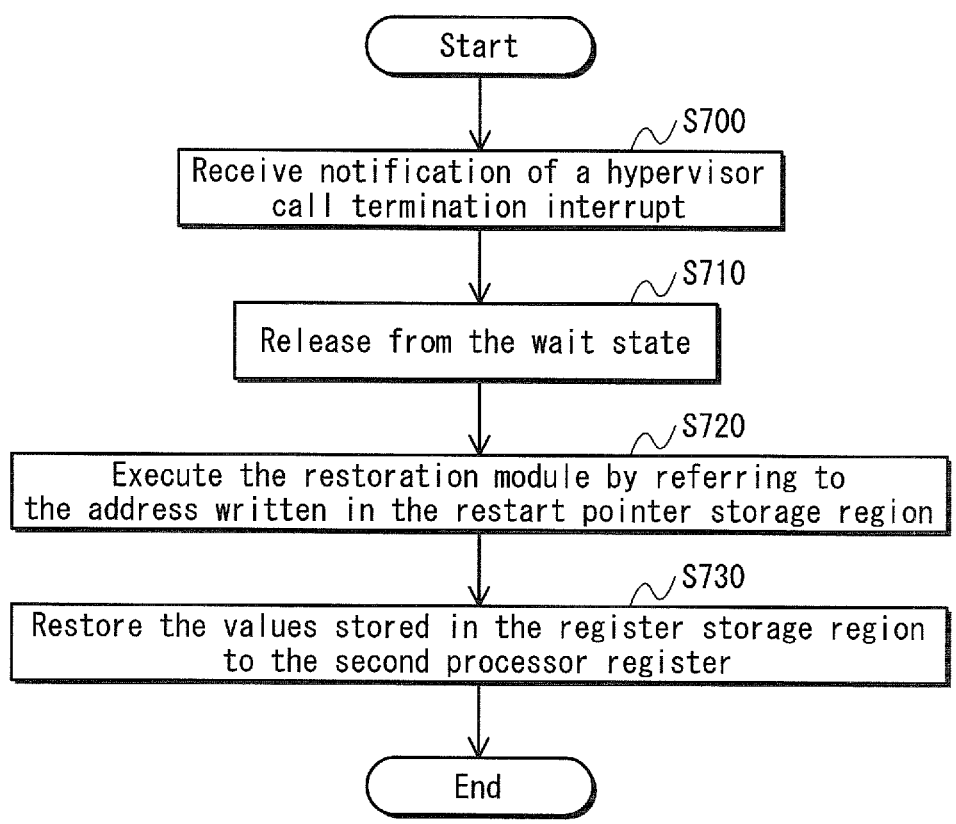
FIG. 7 is a flowchart of processing performed by the second processor 102 during hypervisor call termination processing.

FIG. 6 is a flowchart of processing performed by the first processor 101 during hypervisor call termination processing, and FIG. 7 is a flowchart of processing performed by the second processor 102 during hypervisor call termination processing.

While the third OS 323 that has become a target for execution on the first processor 101 is running on the first processor 101 as a result of the hypervisor call processing, upon termination of processing for the call routine of the hypervisor 351, the OS switching module 352 suspends execution of the task and of the third OS 323 running on the first processor 101, causes the OS management module 353 to save the register values of the first processor 101 in the third OS context memory region 363, and notifies the context updating module 354 of termination of the hypervisor call routine.

Upon being notified of termination of the hypervisor call routine, the context updating module 354 uses the OS management module 353 to read the register values stored in the third OS context memory region 363 and stores the read register values in the register storage region 343 (step S600). The context updating module 354 then writes the starting address of the restoration module 341 in the restart pointer storage region 342 (step S610), uses the interrupt controller 103 to notify the second processor 102 of a hypervisor call termination interrupt (step S620), and notifies the OS switching module 352 of a signal indicating the removal of the third OS 323 from the operating systems under execution control.

The hypervisor call termination interrupt is an interrupt to notify the second processor 102 of termination of processing, corresponding to the hypervisor call interrupt, by the first processor 101.

Upon being notified of the signal indicating the removal of the third OS 323 from the operating systems under execution control, the OS switching module 352 removes the third OS 323 from the operating systems under execution control (step S630).

Completion of the processing in step S630 represents the termination of processing performed by the first processor 101 during the hypervisor call termination processing.

Upon notification of the hypervisor call termination interrupt (FIG. 7, step S700), the second processor 102 releases itself from the wait state (step S710) and refers to the restart pointer storage region 342 to execute the restoration module 341, whose starting address is the address stored in the restart pointer storage region 342 (step S720).

By being executed by the second processor 102, the restoration module 341 restores the values stored in the register storage region 343 to the register of the second processor 102 (step S730).

Completion of the processing in step S730 represents the termination of processing performed by the second processor 102 during the hypervisor call termination processing. The hypervisor call termination processing thus terminates.

As a result of execution of the above hypervisor call termination processing, the third OS 323, which was running on the first processor 101 as a result of hypervisor call processing, returns to running on the second processor 102 after terminating processing for the call routine of the hypervisor 351.

Summary

With the above virtual machine system 100, when a call routine of the hypervisor 351, which is not being executed on the second processor 102, is invoked, the hypervisor call routine can be executed on the first processor 101, which is executing the hypervisor 351.

Accordingly, the second processor 102 need not run the hypervisor 351 in the hypervisor/secure mode 210, thereby allowing the second processor 102 to execute the secure module 370 in the hypervisor/secure mode 210.

Embodiment 2

Outline

As an embodiment of a virtual machine system according to the present invention, the following describes a virtual machine system that is a partial modification to the virtual machine system 100 of Embodiment 1.

The modified virtual machine system of Embodiment 2 has the same hardware structure as the virtual machine system 100 of Embodiment 1. A portion of the executed programs, however, differs from the virtual machine system 100 of Embodiment 1.

The virtual machine system 100 of Embodiment 1 is an example in which the number of operating systems targeted for execution on the second processor 102 is one. The modified virtual machine system of Embodiment 2, on the other hand, is an example in which a plurality operating systems are under execution control by the second processor 102.

With reference to the drawings, the following describes the structure of the modified virtual machine system according to Embodiment 2, focusing on the differences in structure from the virtual machine system of Embodiment 1.

Hardware Structure

The hardware structure of the virtual machine system is the same as the hardware structure of the virtual machine system 100 of Embodiment 1.

A description thereof is thus omitted.

Program Module Structure

Figure 8:
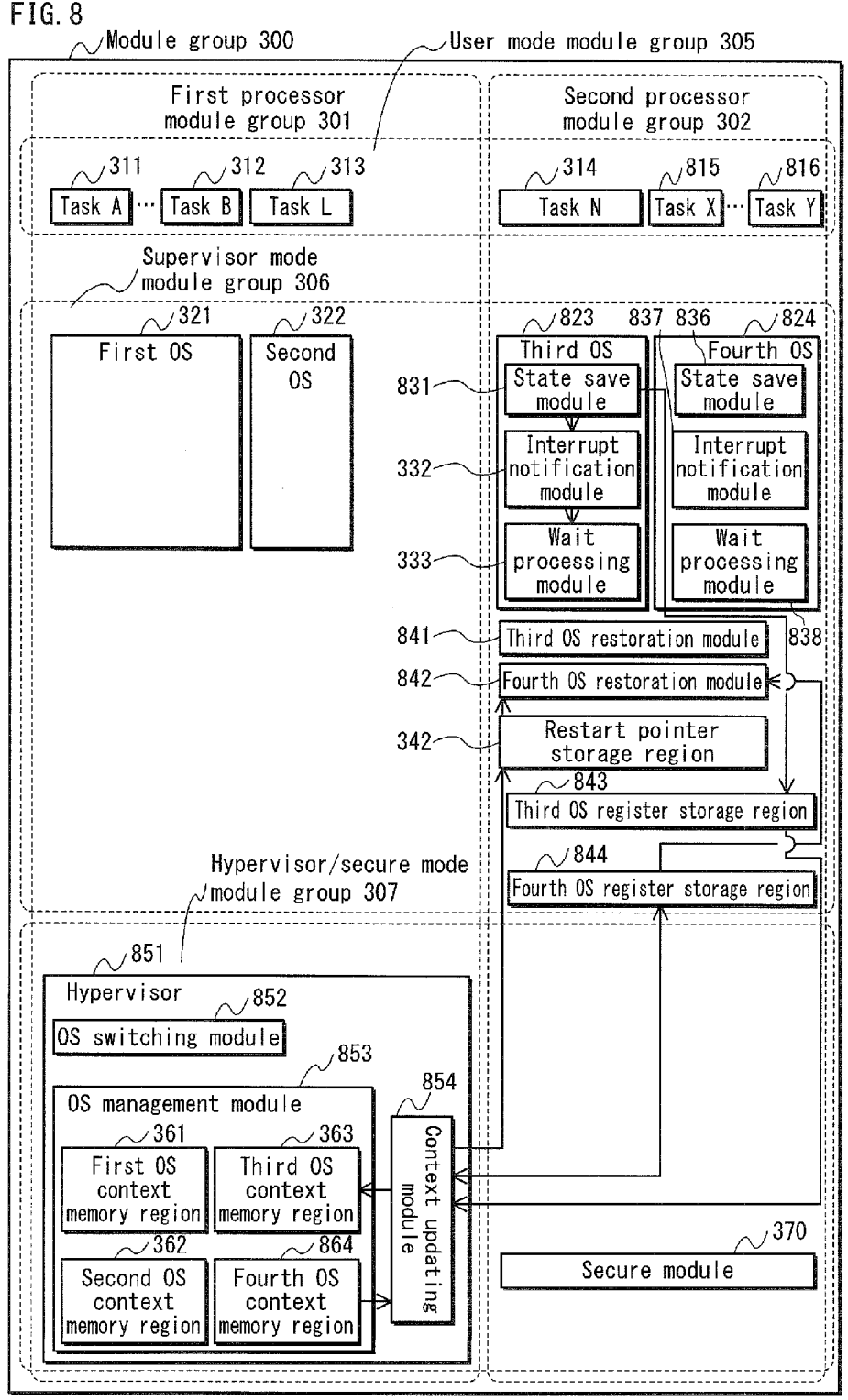
FIG. 8 is a block diagram illustrating program modules running on the multiprocessor LSI 110.

FIG. 8 is a block diagram illustrating modules that are to be executed on the multiprocessor LSI 110 at a given time t0.

As compared to the modules running on the multiprocessor LSI 110 in the virtual machine system 100 of Embodiment 1, the modules running on the multiprocessor LSI 110 in the modified virtual machine system additionally include a fourth OS 824, as well as the following modifications: the state save module 331 is modified to a state save module 831, the restoration module 341 is modified to a third OS restoration module 841 and a fourth OS restoration module 842, the register storage region 343 is modified to a third OS register storage region 843 and a fourth OS register storage region 844, the context updating module 354 is modified to a context updating module 854, the OS management module 353 is modified to an OS management module 853, and the OS switching module 352 is modified to an OS switching module 852.

As a result of the context updating module 354 being modified to the context updating module 854, the OS management module 353 being modified to the OS management module 853, and the OS switching module 352 being modified to the OS switching module 852, the hypervisor 351 is modified to a hypervisor 851. As a result of the state save module 331 being modified to the state save module 831, the third OS 323 is modified to a third OS 823. As a result of addition of the fourth OS 824, task X 815 through task Y 816, which are under execution control by the fourth OS 824, are added.

The third OS register storage region 843 is a portion of the memory region of the RAM 105. The third OS register storage region 843 stores register values of a processor, specifically the register values of the processor running the third OS 823, and is set to be accessible only by modules running on a processor in a privileged mode of at least the supervisor mode.

The fourth OS register storage region 844 is a portion of the memory region of the RAM 105. The fourth OS register storage region 844 stores register values of a processor, specifically the register values of the processor running the fourth OS 824, and is set to be accessible only by modules running on a processor in a privileged mode of at least the supervisor mode.

The third OS restoration module 841 is a module running on the second processor 102 in supervisor mode and has a function to restore the values stored in the third OS register storage region 843 into the register of the second processor 102.

The fourth OS restoration module 842 is a module running on the second processor 102 in supervisor mode and has a function to restore the values stored in the fourth OS register storage region 844 into the register of the second processor 102.

The fourth OS 824 is a multitask operating system that runs independently of other operating systems. The fourth OS 824 runs in the supervisor mode of the processor.

Furthermore, the fourth OS 824 performs execution control on task X 815 through task Y 816 and internally includes a state save module 836, an interrupt notification module 837, and a wait processing module 838.

At time t0, execution of the fourth OS 824 is suspended, and the register values of the second processor 102 at the point at which execution of the fourth OS 824 was suspended are stored in the fourth OS register storage region 844.

The state save module 831 is a modification of the state save module 331 in Embodiment 1. In addition to the functions of the state save module 331, the state save module 831 has the following two functions.

Additional function 1: while the OS that includes the state save module 831 is running on the second processor 102, upon the second processor 102 being notified of an interrupt for an OS other than the OS that includes the state save module 831 (hereinafter referred to as an "undefined interrupt"), the state save module 831 suspends execution of the task under execution control by the OS including the state save module 831 and saves the register values of the processor on which the state save module 831 is running in the register storage region corresponding to the OS that includes the state save module 831.

Additional function 2: while the OS that includes the state save module 831 is running on the second processor 102, upon notification of a secure function call interrupt (described below), the state save module 831 suspends execution of the task under execution control by the OS including the state save module 831 and saves the register values of the processor on which the state save module 831 is running in the register storage region corresponding to the OS that includes the state save module 831.

The state save module 836, the interrupt notification module 837, and the wait processing module 838 are modules respectively having the same functions as the state save module 831, the interrupt notification module 332, and the wait processing module 333.

The OS management module 853 is a modification of the OS management module 353 in Embodiment 1 and additionally includes a fourth OS context memory region 864. In addition to the functions of the OS management module 353, the OS management module 853 has the following two functions.

Note that the fourth OS context memory region 864 is a portion of the memory region of the RAM 105 for storing register values when the processor whose register values are to be stored is executing the fourth OS 824. The fourth OS context memory region 864 is set to be accessible only by a module running on the first processor in hypervisor/secure mode.

Additional function 1: a function to store processor register values in the fourth OS context memory region 864.

Additional function 2: a function to read processor register values from the fourth OS context memory region 864.

The OS switching module 852 is a modification of the OS switching module 352 in Embodiment 1. In addition to the functions of the OS switching module 352, the OS switching module 852 has the following function.

Additional function: a function such that when requested, by a task under execution control by an OS running on a first processor, to invoke a call routine of a secure module for the OS, the OS switching module 852 suspends execution of the task and the OS with an instruction immediately after the invocation of the call routine, causes the OS management module 853 to save register values of the first processor 101 in the context memory region of the corresponding OS, and notifies the context updating module 854 that the secure module has been invoked.

The context updating module 854 is a modification of the context updating module 354 in Embodiment 1. In addition to the functions of the context updating module 354, the context updating module 854 includes the following four functions.

Additional function 1: a function such that, when the first processor 101 is notified of an undefined interrupt occurrence interrupt (described below), the context updating module 854 (1) reads the processor register values saved in the register storage region corresponding to a pre-switch OS, (2) stores the read register values in the context memory region corresponding to the pre-switch OS using the OS management module 853, (3) reads the register values saved in the context memory region corresponding to a post-switch OS using the OS management module 853, (4) stores the read register values in the register storage region corresponding to the post-switch OS, (5) writes the starting address of the restoration module of the post-switch OS in the restart pointer storage region 342, and (6) notifies the second processor 102 of an undefined interrupt response interrupt (described below) using the interrupt controller 103.

Additional function 2: a function such that, when the first processor 101 is notified of a modified hypervisor call interrupt (described below), the context updating module 854 (1) reads the processor register values saved in the register storage region corresponding to a pre-switch OS, (2) stores the read register values in the context memory region corresponding to the pre-switch OS using the OS management module 853, (3) notifies the OS switching module 852 of a signal indicating the addition of the pre-switch OS to the operating systems under execution control, (4) reads the register values saved in the context memory region corresponding to a post-switch OS using the OS management module 853, (5) stores the read register values in the register storage region corresponding to the post-switch OS, (6) writes the starting address of the restoration module of the post-switch OS in the restart pointer storage region 342, and (7) notifies the second processor 102 of a modified hypervisor response interrupt (described below) using the interrupt controller 103.

Additional function 3: a function such that, upon being notified by the OS switching module 852 that the secure module has been invoked, the context updating module 854 (1) reads the register values stored in the context memory region of the corresponding OS using the OS management module 853, (2) stores the read register values in the register storage region of the corresponding OS, (3) writes the starting address of the restoration module of the corresponding OS in the restart pointer storage region 342, (4) notifies the second processor 102 of a secure function call interrupt using the interrupt controller 103, and (5) notifies the OS switching module 852 of a signal indicating that the corresponding OS has been removed from the operating systems under execution control.

Additional function 4: a function such that, when the first processor 101 is notified of a secure function response interrupt (described below), the context updating module 854 (1) reads the processor register values saved in the register storage region corresponding to a pre-switch OS, (2) stores the read register values in the context memory region corresponding to the pre-switch OS using the OS management module 853, and (3) notifies the second processor 102 of a wait release interrupt using the interrupt controller 103.

With reference to the drawings, the following describes operations of the modified virtual machine system with the above structure.

Operations

Among operations by the virtual machine system 100, the following describes characteristic operations, namely undefined interrupt processing, modified hypervisor call processing, and secure function call processing.

Undefined Interrupt Processing

Undefined interrupt processing is processing, performed when an operating system (in this example, the fourth OS 824) whose execution is currently suspended on the second processor 102 is notified of an interrupt, in order to suspend processing by an operating system on the second processor 102 (in this example, the third OS 823) and instead restart execution of the operating system whose execution is currently suspended on the second processor 102.

The undefined interrupt processing is implemented by the first processor 101 and the second processor 102 in coordination.

Figure 9:
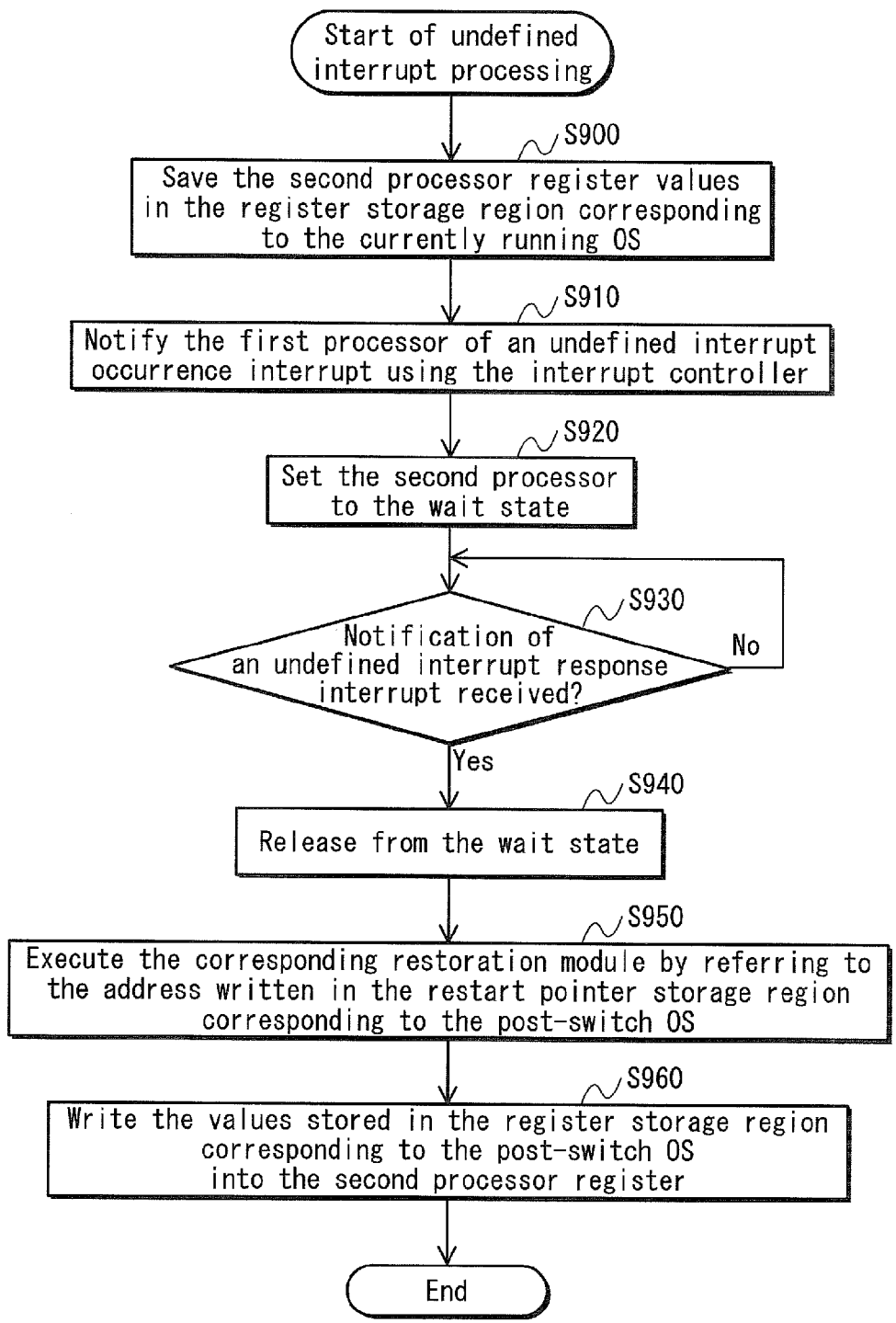
FIG. 9 is a flowchart of processing performed by the second processor 102 during undefined interrupt processing.
Figure 10:
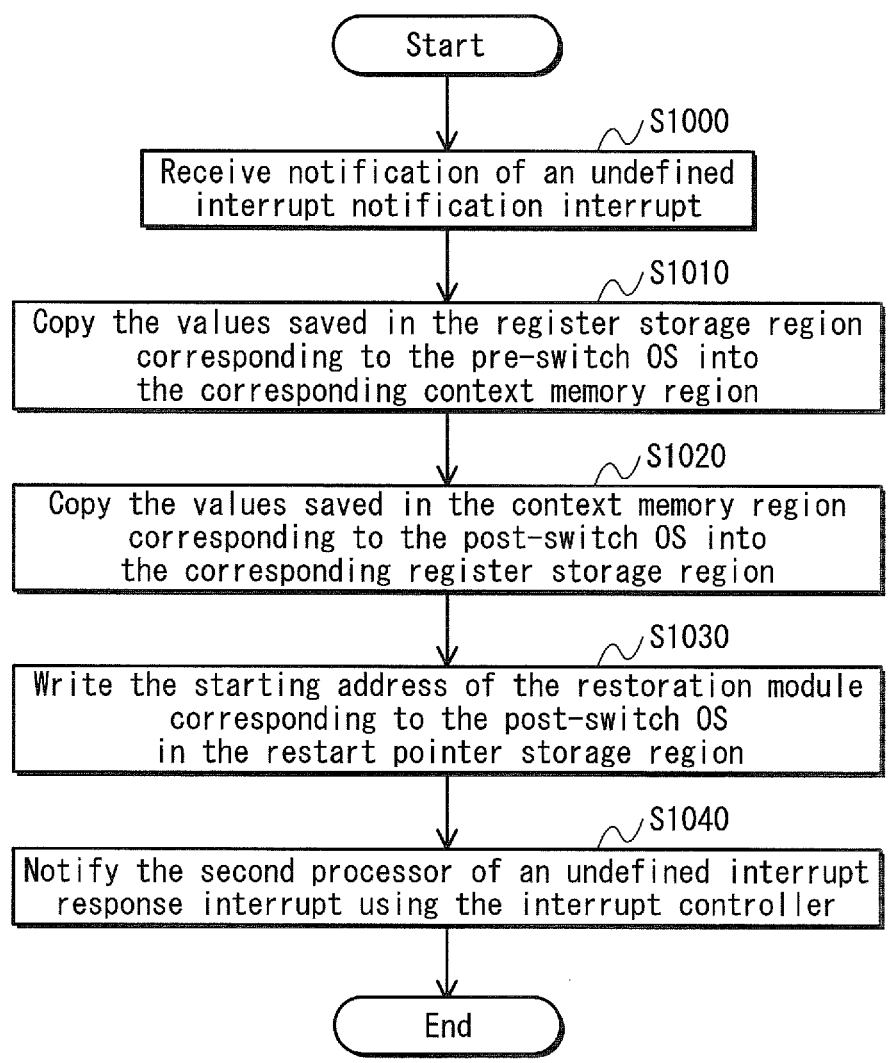
FIG. 10 is a flowchart of processing performed by the first processor 101 during undefined interrupt processing.

FIG. 9 is a flowchart of processing performed by the second processor 102 during undefined interrupt processing, and FIG. 10 is a flowchart of processing performed by the first processor 101 during undefined interrupt processing.

While the third OS 823 is running on the second processor 102, the undefined interrupt processing begins when the second processor 102 is notified of an interrupt for the fourth OS 824, whose execution is currently suspended.

Upon the second processor 102 being notified of an interrupt for the fourth OS 824, the state save module 831 suspends execution of task N 314 that is being executed by the third OS 823 and saves the register values of the second processor 102 in the third OS register storage region 843 (FIG. 9, step S900).

The interrupt notification module 332 notifies the first processor 101 of an undefined interrupt occurrence interrupt, using the interrupt controller 103, when the state save module 831 saves the register values in the third OS register storage region 843 (step S910).

The undefined interrupt occurrence interrupt is an interrupt to notify the first processor 101 that the second processor 102 has been notified of an undefined interrupt.

The wait processing module 333 sets the second processor 102 to a wait state when the interrupt notification module 332 notifies the first processor 101 of the undefined interrupt occurrence interrupt (step S920).

Subsequently, the second processor 102 remains in the wait state until being notified by the interrupt controller 103 of an undefined interrupt response interrupt, described below (repetition of step S930: No).

Upon the first processor 101 being notified of the undefined interrupt occurrence interrupt (FIG. 10, step S1000), the context updating module 854 reads the processor register values saved in the third OS register storage region 843 and, using the OS management module 853, writes the read register values in the third OS context memory region 363 (step S1010).

Upon completion of the processing in step S1010, the context updating module 854 uses the OS management module 853 to read the register values stored in the fourth OS context memory region 864, write the read register values in the fourth OS register storage region 844 (step S1020), and write the starting address of the fourth OS restoration module 842 in the restart pointer storage region 342 (step S1030).

Upon the completion of the processing in step S1030, the context updating module 854 uses the interrupt controller 103 to notify the second processor 102 of an undefined interrupt response interrupt (step S1040).

The undefined interrupt response interrupt is an interrupt to notify the second processor 102 of termination of processing, corresponding to the undefined interrupt occurrence interrupt, by the first processor 101.

Completion of the processing in step S1040 represents the termination of processing performed by the first processor 101 during the undefined interrupt processing.

While the second processor 102 is in the wait state, upon notification of the undefined interrupt response interrupt (FIG. 9, step S930: Yes), the second processor 102 releases itself from the wait state (step S940) and refers to the restart pointer storage region 342 to execute the fourth OS restoration module 842, whose starting address is the address stored in the restart pointer storage region 342 (step S950).

By being executed by the second processor 102, the fourth OS restoration module 842 restores the values stored in the fourth OS register storage region 844 to the register of the second processor 102 (step S960).

Completion of the processing in step S960 represents the termination of processing performed by the second processor 102 during the undefined interrupt processing. The undefined interrupt processing thus terminates.

As a result of execution of the above undefined interrupt processing, the fourth OS 824, whose execution had been suspended, begins to operate again on the second processor 102. The fourth OS 824 can therefore process the interrupt of which it was notified during the period of suspension.

Modified Hypervisor Call Processing

While execution of an operating system (in this example, the fourth OS 824) is suspended on the second processor 102, modified hypervisor call processing is performed when a task (in this example, task N 314) under execution control by an operating system (in this example, the third OS 823) running on the second processor 102 requests that the running operating system invoke a call routine of the hypervisor 851. The modified hypervisor call processing is processing to suspend execution of the operating system running on the second processor 102 and to execute the operating system that was running on the second processor 102 on the first processor 101 instead, and furthermore to restart execution on the second processor 102 of the operating system whose execution on the second processor 102 was suspended.

The modified hypervisor call processing is implemented by the first processor 101 and the second processor 102 in coordination.

Figure 11:
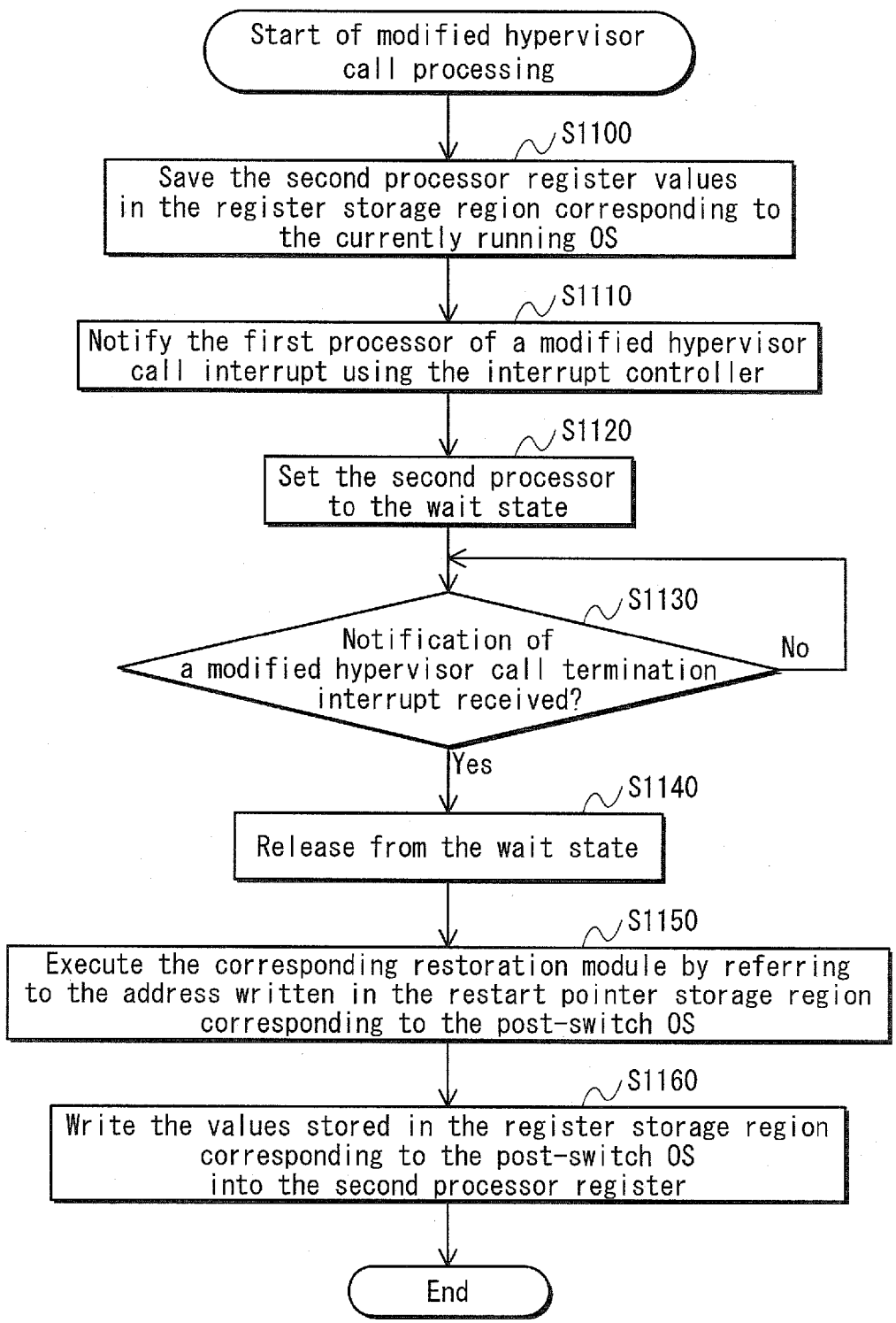
FIG. 11 is a flowchart of processing performed by the second processor 102 during modified hypervisor call processing.
Figure 12:
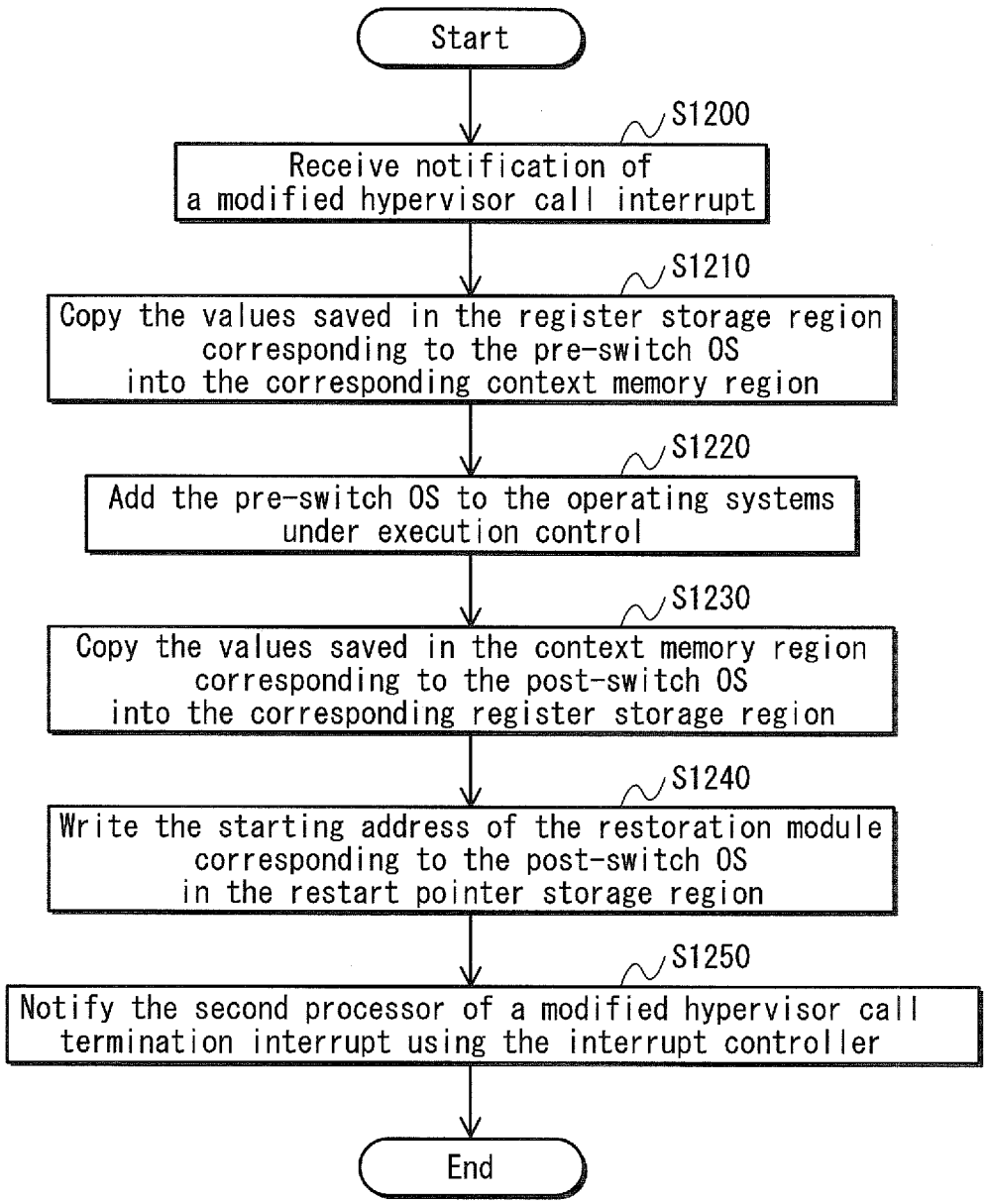
FIG. 12 is a flowchart of processing performed by the first processor 101 during modified hypervisor call processing.

FIG. 11 is a flowchart of processing performed by the second processor 102 during modified hypervisor call processing, and FIG. 12 is a flowchart of processing performed by the first processor 101 during modified hypervisor call processing.

While execution of the fourth OS 824 is suspended on the second processor 102, the modified hypervisor call processing starts when task N 314 issues a request to the third OS 823 to invoke a call routine of the hypervisor 851.

When the call routine of the hypervisor 851 is invoked, the state save module 831 suspends execution of the task with an instruction immediately after the invocation of the call routine and saves register values of the second processor 102 in the third OS register storage region 843 (FIG. 11, step S1100).

The interrupt notification module 332 notifies the first processor 101 of a modified hypervisor call interrupt, using the interrupt controller 103, when the state save module 831 saves the register values in the third OS register storage region 843 (step S1110).

The modified hypervisor call interrupt is an interrupt, issued while execution of an operating system is currently suspended on the second processor 102, to notify the first processor 101 that the call routine of the hypervisor 851 has been invoked on the second processor 102.

The wait processing module 333 sets the second processor 102 to a wait state when the interrupt notification module 332 notifies the first processor 101 of the modified hypervisor call interrupt (step S1120).

Subsequently, the second processor 102 remains in the wait state until being notified by the interrupt controller 103 of a modified hypervisor call termination interrupt (repetition of step S1130: No).

Once the first processor 101 is notified of a modified hypervisor call interrupt (FIG. 12, step S1200), the context updating module 854 reads the processor register values that are saved in the third OS register storage region 843, stores the read register values in the third OS context memory region 363 using the OS management module 853 (step S1210), and notifies the OS switching module 852 of a signal indicating the addition of the third OS 823 to the operating systems under execution control.

Upon receiving the notification of the signal indicating the addition of the third OS 823 to the operating systems under execution control, the OS switching module 852 adds the third OS 323 to the operating systems under execution control (step S1220).

Upon completion of the processing in step S1220, the context updating module 854 uses the OS management module 853 to read the register values stored in the fourth OS context memory region 864, write the read register values in the fourth OS register storage region 844 (step S1230), and write the starting address of the fourth OS restoration module 842 in the restart pointer storage region 342 (step S1240).

Once the processing in step S1240 is complete, the context updating module 854 uses the interrupt controller 103 to notify the second processor 102 of a modified hypervisor call termination interrupt (step S1250).

The modified hypervisor call termination interrupt is an interrupt to notify the second processor 102 of termination of processing, corresponding to the modified hypervisor call interrupt, by the first processor 101.

Completion of the processing in step S1250 represents the termination of processing performed by the first processor 101 during the modified hypervisor call processing.

While the second processor 102 is in the wait state, upon notification of the modified hypervisor call termination interrupt (FIG. 9, step S1130: Yes), the second processor 102 releases itself from the wait state (step S1140) and refers to the restart pointer storage region 342 to execute the fourth OS restoration module 842, whose starting address is the address stored in the restart pointer storage region 342 (step S1150).

By being executed by the second processor 102, the fourth OS restoration module 842 restores the values stored in the fourth OS register storage region 844 to the register of the second processor 102 (step S1160).

Completion of the processing in step S1160 represents the termination of processing performed by the second processor 102 during the modified hypervisor call processing. The modified hypervisor call processing thus terminates.

As a result of execution of the above hypervisor call processing, the third OS 823 that was running on the second processor 102 runs on the first processor 101. Accordingly, the third OS 823 can execute a call routine of the hypervisor 851.

Secure Function Call Processing

Figure 13:
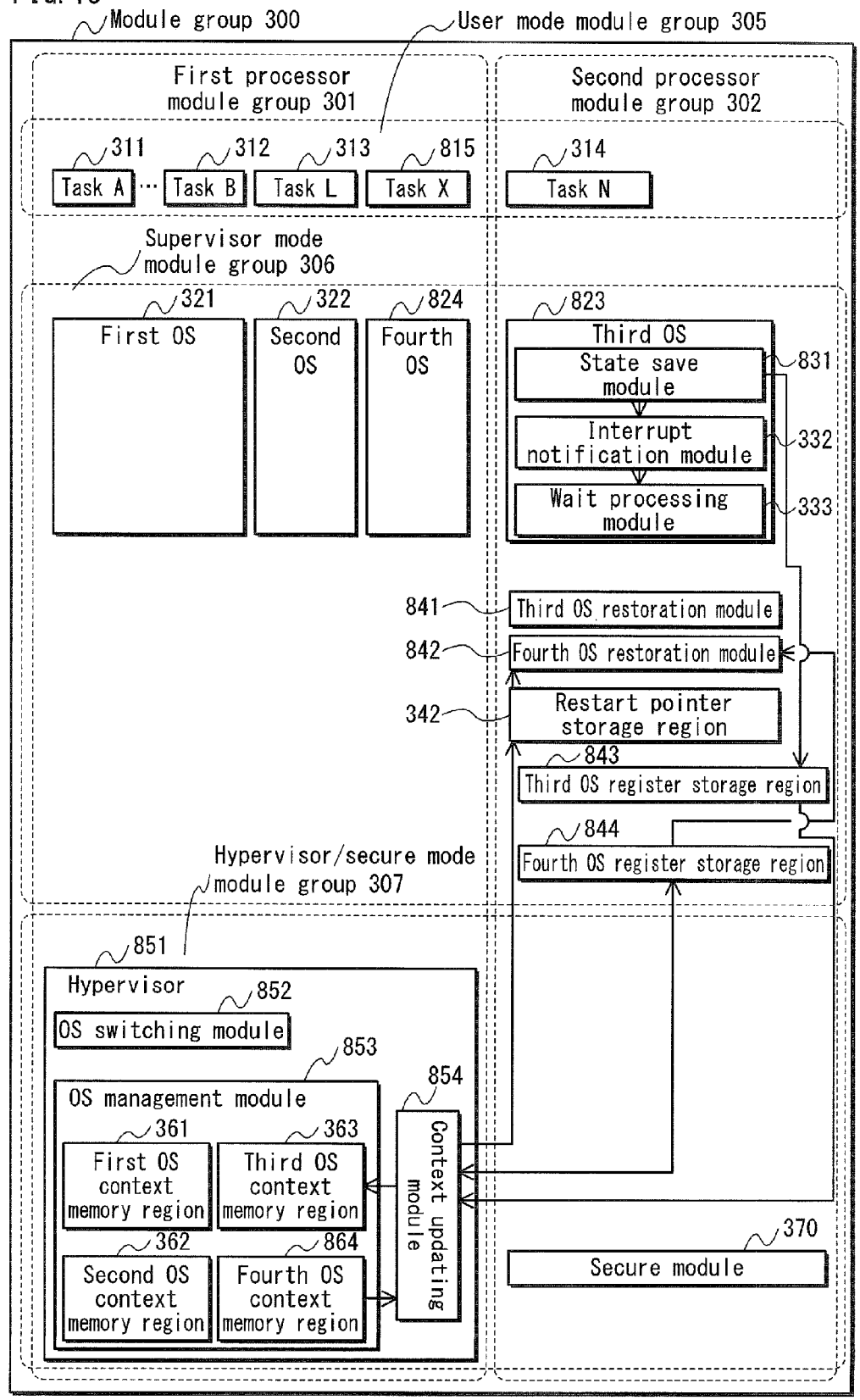
FIG. 13 is a block diagram illustrating program modules running on the multiprocessor LSI 110.

FIG. 13 is a block diagram illustrating modules that are to be executed on the multiprocessor LSI 110 at a given time t1.

The differences from the modules that are to be executed on the multiprocessor LSI 110 at time t0 (see FIG. 8) are that the fourth OS 824 is an operating system targeted for time sharing execution by the first processor, and that the only task under execution control by the fourth OS 824 is task X 815.

The secure function call processing is performed when a task (in this example, task X 815) whose execution is controlled by an operating system running on the first processor 101 (in this example, the fourth OS 824) requests that the fourth OS 824 invoke a call routine of the secure module 370. The secure function call processing suspends execution of the fourth OS 824 on the first processor 101 and executes the suspended fourth OS 824 on the second processor 102.

The secure function call processing is implemented by the first processor 101 and the second processor 102 in coordination.

Figure 14:
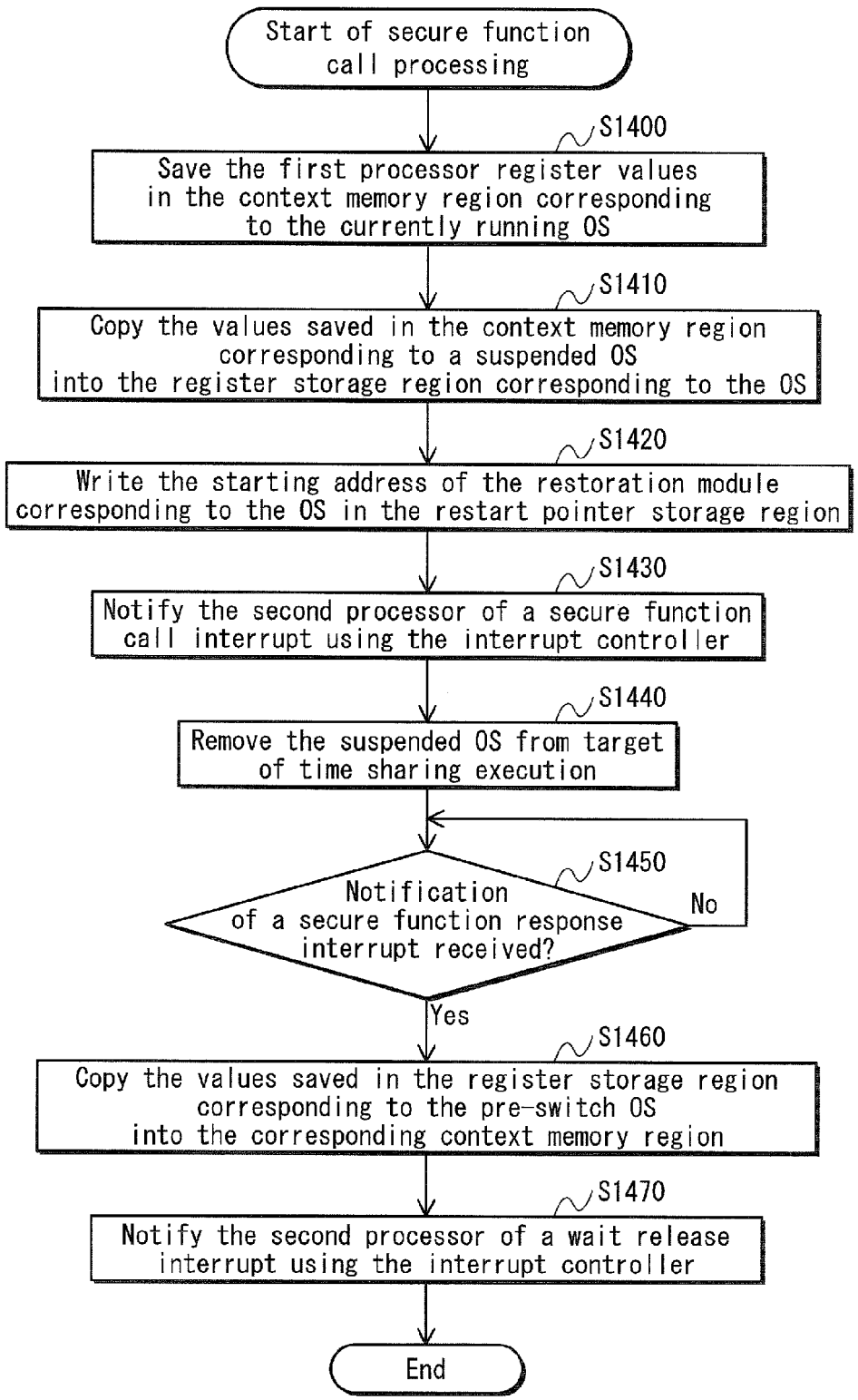
FIG. 14 is a flowchart of processing performed by the first processor 101 during secure function call processing.
Figure 15:
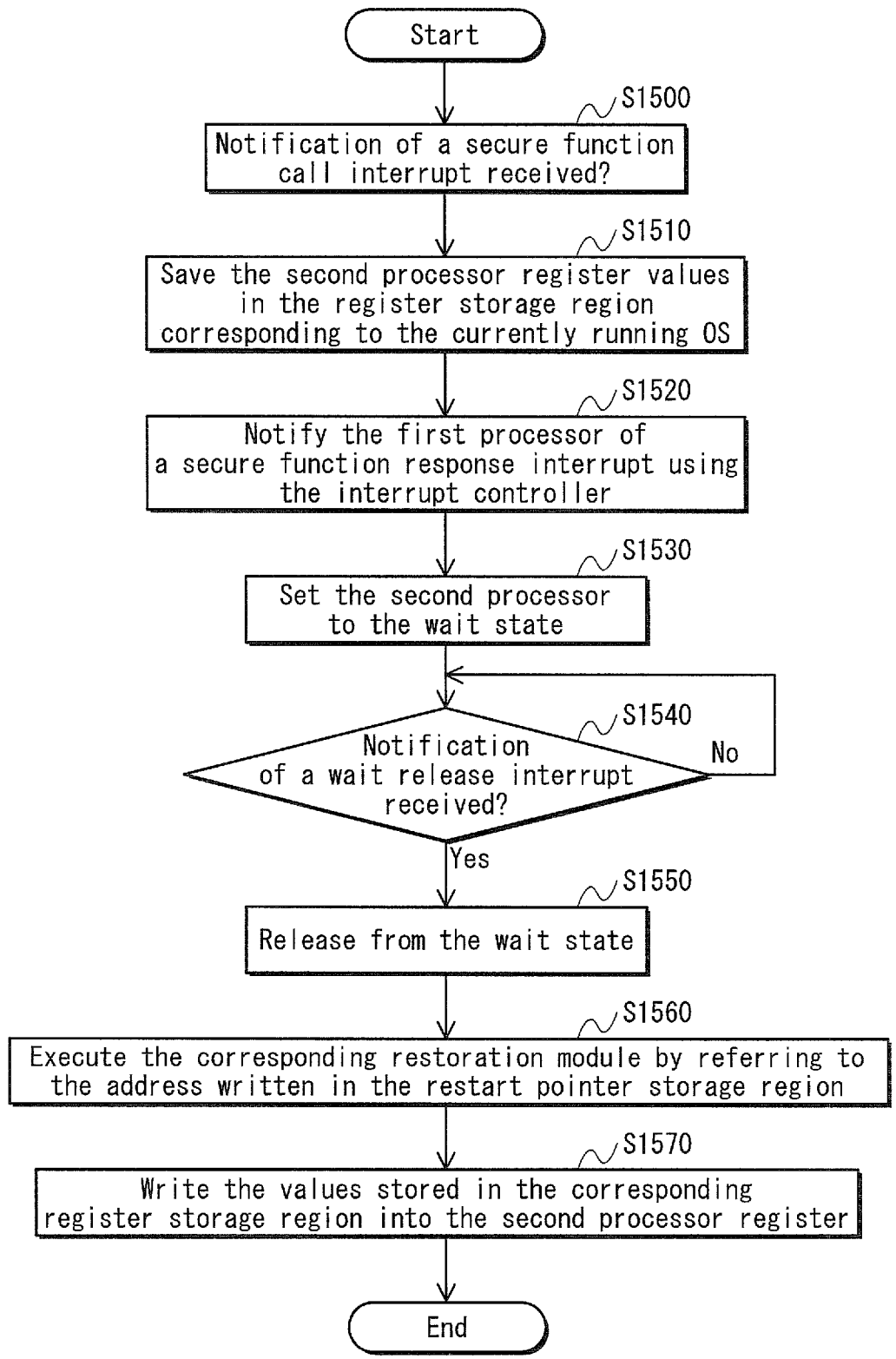
FIG. 15 is a flowchart of processing performed by the second processor 102 during secure function call processing.
Figure 16:
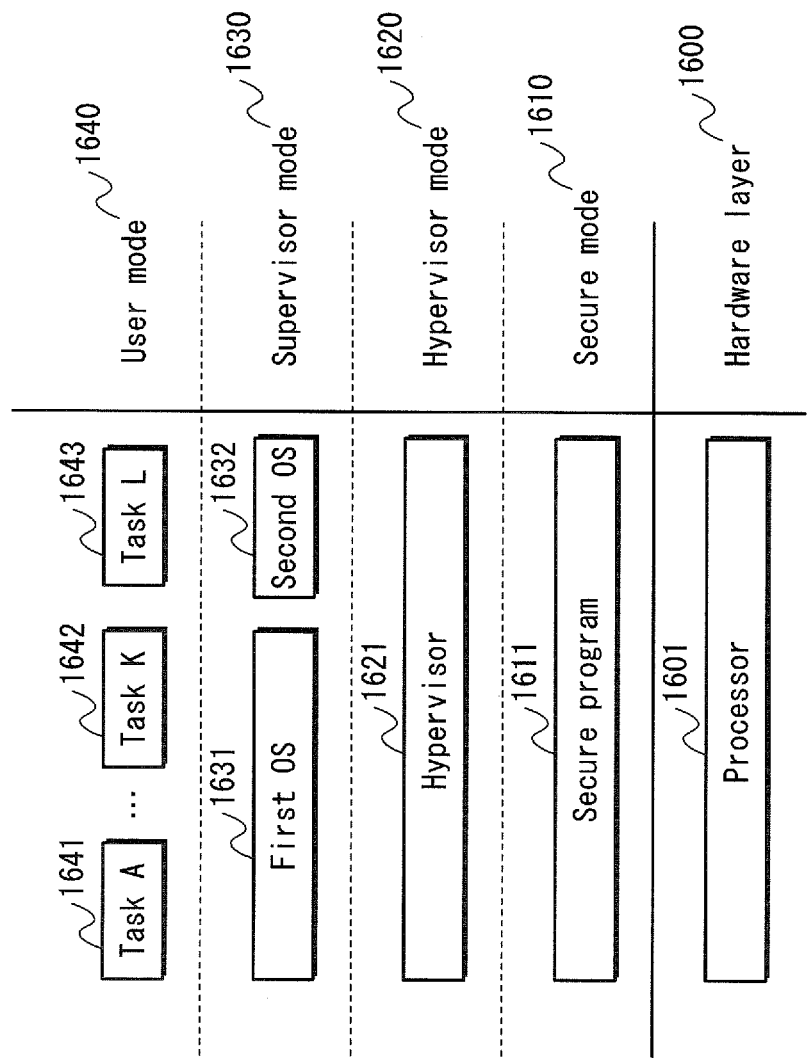
FIG. 16 illustrates operation modes with which a conventional processor is provided.

FIG. 14 is a flowchart of processing performed by the first processor 101 during the secure function call processing, and FIG. 15 is a flowchart of processing performed by the second processor 102 during the secure function call processing.

While the fourth OS 824 is running on the first processor 101, the secure function call processing starts when task X 815 issues a request to the fourth OS 824 to invoke a call routine of the secure module 370.

When the call routine of the secure module 370 is invoked, the OS switching module 852 suspends execution of task X 815 and the fourth OS 824 with an instruction immediately after the invocation of the call routine and saves register values of the first processor 101 in the fourth OS context memory region 864 using the OS management module 853 (step S1400). The OS switching module 852 then notifies the context updating module 854 that the secure module has been invoked.

Upon receiving notification that the secure module has been invoked, the context updating module 854 uses the OS management module 853 to read the register values stored in the fourth OS context memory region 864 and stores the read register values in the fourth OS register storage region 844 (step S1410). The context updating module 854 then writes the starting address of the fourth OS restoration module 842 in the restart pointer storage region 342 (step S1420) and, using the interrupt controller 103, notifies the second processor 102 of a secure function call interrupt (step S1430).

The secure function call interrupt is an interrupt to notify the second processor 102 of invocation of the secure module on the first processor 101.

Upon notifying the second processor 102 of the secure function call interrupt, the context updating module 854 notifies the OS switching module 852 of a signal indicating that the fourth OS 824 has been removed from the operating systems under execution control.

Upon being notified of the signal indicating the removal of the fourth OS 824 from the operating systems under execution control, the OS switching module 852 removes the fourth OS 824 from the operating systems under execution control (step S1440).

The context updating module 854 subsequently waits until receiving a secure function response interrupt (described below; repetition of step S1450: No).

Upon the second processor 102 receiving notification of the secure function call interrupt (FIG. 15, step S1500), the state save module 831 suspends the task under execution control and saves the register values of the second processor 102 in the third OS register storage region 843 (step S1510).

The interrupt notification module 332 notifies the first processor 101 of a secure function response interrupt, using the interrupt controller 103, when the state save module 831 saves the register values in the third OS register storage region 843 (step S1520).

The secure function response interrupt is an interrupt to notify the first processor 101 of termination of processing, corresponding to the secure function call interrupt, by the second processor 102.

The wait processing module 333 sets the second processor 102 to a wait state when the interrupt notification module 332 notifies the first processor 101 of the secure function response interrupt (step S1530).

Subsequently, the second processor 102 remains in the wait state until being notified by the interrupt controller 103 of a wait release interrupt (described below; repetition of step S1540: No).

Upon the first processor 101 receiving notification of the secure function response interrupt (FIG. 14, step S1450: Yes), the context updating module 854 reads the processor register values saved in the third OS register storage region 843 and stores the read register values in the third OS context memory region 363 using the OS management module 853 (step S1460).

Upon storing the read register values in the third OS context memory region 363, the context updating module 854 notifies the second processor 102 of a wait release interrupt using the interrupt controller 103 (step S1470).

The wait release interrupt is an interrupt to notify the second processor 102 of release from the wait state.

Completion of the processing in step S1470 represents the termination of processing performed by the first processor 101 during the secure function call processing.

Upon notification of the wait release interrupt (FIG. 15, step S1540: Yes), the second processor 102 releases itself from the wait state (step S1550) and refers to the restart pointer storage region 342 to execute the fourth OS restoration module 842, whose starting address is the address stored in the restart pointer storage region 342 (step S1560).

By being executed by the second processor 102, the fourth OS restoration module 842 restores the values stored in the fourth OS register storage region 844 to the register of the second processor 102 (step S1570).

Completion of the processing in step S1570 represents the termination of processing performed by the second processor 102 during the secure function call processing. The secure function call processing thus terminates.

As a result of execution of the above secure function call processing, the fourth OS that was running on the first processor 101 runs on the second processor 102. Accordingly, the fourth OS 824 can execute the secure module 370.

As an example of characteristic operations performed by the modified virtual machine system, the undefined interrupt processing, modified hypervisor call processing, and secure function call processing have been described. The modified virtual machine system may further be caused to perform the following operations, for example.

Time Sharing Processing In Second Processor 102

The above undefined interrupt processing suspends execution of the third OS 823, which was running on the second processor 102, and executes the fourth OS 824, whose execution is currently suspended on the second processor 102. Furthermore, the undefined interrupt processing begins upon being notified of an interrupt for the fourth OS 824 whose execution is currently suspended on the second processor 102. Alternatively, if for example the state save module 831 of the third OS 823 and the state save module 836 of the fourth OS 824 use the timer 109 to begin similar processing to the undefined interrupt processing each time a predetermined interval T2 (such as 10 ms) elapses, then the third OS 823 and the fourth OS 824 can be executed alternately on the second processor 102 over a period of the predetermined interval T2 (such as 10 ms).

Summary

With the above modified virtual machine system, when an interrupt occurs for an operating system whose execution is currently suspended on the second processor 102, the interrupt can be processed by restarting the operating system.

Furthermore, with the modified virtual machine system, when a call routine of the secure module 370 is invoked on the first processor 101, which is not executing the secure module 370, the call routine of the secure module 370 can be executed on the second processor 102, which is executing the secure module 370.

Additionally, with the modified virtual machine system, when a call routine of the hypervisor 851, which is not being executed on the second processor 102, is invoked, the hypervisor call routine can be executed on the first processor 101, which is executing the hypervisor 851.

Accordingly, the second processor 102 need not run the hypervisor 851 in the hypervisor/secure mode 210, thereby allowing the second processor 102 to execute the secure module 370 in the hypervisor/secure mode 210.

Supplementary Explanation

As embodiments of the virtual machine system according to the present invention, examples of two virtual machine systems have been described in Embodiment 1 and Embodiment 2. The virtual machine system is not, however, limited to being exactly as described in the above embodiments, and may be modified as follows.

(1) In Embodiment 1, an example of providing the virtual machine system 100 with two processors is described. As long as at least one processor that executes a hypervisor and at least one processor that executes a secure module are provided, however, the number of processors is not limited to two. The number of processors may, for example, be another number such as three, five, or 10.

(2) In the example described in Embodiment 1, the number of operating systems whose execution control is targeted for switching by the hypervisor 351 on the first processor 101 is two. As long as the hypervisor 351 can switch execution control of the operating systems, however, the number of operating systems is not limited to two and may, for example, be another number such as three, five, or 10.

In the example described in Embodiment 2, the number of operating systems running on the second processor 102 is two. As long as the operating systems can be executed by the second processor 102, however, the number of operating systems is not limited to two and may, for example, be another number such as three, five, or 10.

(3) In the example described in Embodiment 1, the first processor 101, the second processor 102, the interrupt controller 103, the ROM 104, the RAM 105, the first interface 106, the second interface 107, the third interface 108, and the timer 109 are integrated into one multiprocessor LSI 110. These circuits do not, however, need to be integrated into one LSI. As long as the functions to be achieved by the multiprocessor LSI 110 can in fact be achieved, circuits need not be integrated on one LSI. For example, each circuit may be integrated into a different integrated circuit.

Note that when switching between operating systems in examples in Embodiments 1 and 2, the execution state is either saved or restored using the processor register values, yet other than the register values, information stored in a memory location within the processor may be used as execution state information, such as the following: (1) information on all or a portion of the local memory in the processor, such as an encryption key for each virtual machine; (2) a portion of the cache when there is a program running under the assumption that instruction codes and data are loaded into the cache; or (3) a TLB entry when an instruction for TLB loading exists.

(4) In the example described in Embodiment 1, the first processor 101 and the second processor 102 are each provided with two privileged modes. As long as each processor is provided with at least two privileged modes, however, the number of privileged modes is not limited to be two. For example, between the first processor 101 and the second processor 102, one may be provided with three privileged modes.

(5) In the example described in Embodiment 1, the restoration module 341 is provided external to the operating systems. As long as the restoration module 341 can be executed by the second processor 102 when the second processor 102 is released from the wait state, however, the restoration module 341 need not be provided external to the operating systems. For example, the restoration module 341 may be provided within the third OS 323.

(6) In the example described in Embodiment 1, the register storage region 343 is provided external to the operating systems. As long as the register storage region 343 can be accessed by the context updating module 354, however, the register storage region 343 need not be provided external to the operating systems and may, for example, be provided within the third OS 323.

(7) In the example described in Embodiment 1, the secure program has a function to perform decryption processing using an encryption key stored in the ROM 104. As long as the secure program has a function to perform processing that is to be kept confidential from third parties, however, the secure program is not limited to having a function to perform decryption processing using an encryption key stored in the ROM 104. For example, the secure program may have a function to perform processing for managing PIN numbers for credit cards.

(8) In the example in Embodiment 1, the virtual machine system 100 is provided with the hard disk device 128. As long as the virtual machine system 100 is provided with a large-capacity external storage device, however, the hard disk device 128 need not be provided. For example, the virtual machine system 100 may be provided with a large-capacity flash memory.

(9) The following describes the structure of a virtual machine system relating to another embodiment of the present invention, modifications of the embodiment, and effects of the embodiment and the modifications.

(a) A virtual machine system according to an embodiment of the present invention comprises: a memory including an execution state storage region for storing execution state information on an execution state of a processor; a first processor and a second processor each connected to the memory and provided with a low privileged mode and a high privileged mode higher than the low privileged mode; one or more operating systems running in the low privileged mode on a processor; a hypervisor, running in the high privileged mode on the first processor, configured to cause the first processor to perform processing for switching the operating system by saving and restoring execution state information in the execution state storage region, and to provide the second processor with restoration notification based on the execution state information saved in the execution state storage region; and a restoration program, running in the low privileged mode on the second processor, configured to cause the second processor to restore the execution state information stored in the execution state storage region to the execution state information of the second processor upon receipt by the second processor of the restoration notification.

With the above structure, the virtual machine system according to the present embodiment can transfer an operating system targeted for switching by the first processor to the second processor and execute the operating system on the second processor, even if no hypervisor is running on the second processor in the high privileged mode.

As a result, the high privileged mode of the second processor can be used as a secure mode for executing a secure program.

Therefore, even though the first processor and the second processor in the virtual machine system only have two privileged modes, the virtual machine system can achieve both an operating system switching function that guarantees system reliability and a security protection function that uses a secure program.

Figure 17:
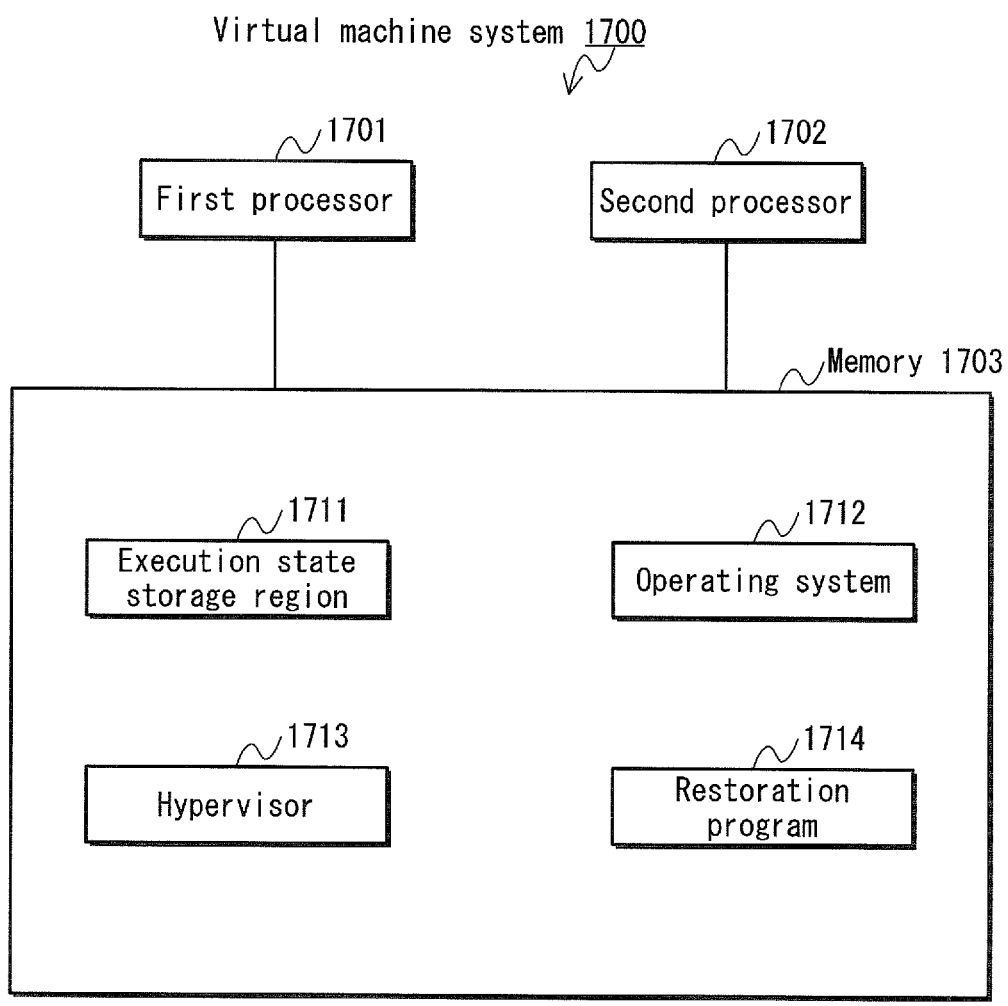
FIG. 17 illustrates the configuration of a virtual machine system 1700 in a modification.

FIG. 17 illustrates the configuration of a virtual machine system 1700 in the above modification.

As shown in FIG. 17, the virtual machine system 1700 includes a first processor 1701, a second processor 1702, and a memory 1703. The memory 1703 includes an execution state storage region 1711. An operating system 1712, a hypervisor 1713, and a restoration program 1714 are loaded into the memory 1703.

The first processor 1701 is connected to the memory 1703 and is provided with a low privileged mode and a high privileged mode higher than the low privileged mode. The first processor 1701 is, for example, implemented as the first processor 101 of Embodiment 1 (see FIG. 1).

The second processor 1702 is connected to the memory 1703 and is provided with a low privileged mode and a high privileged mode higher than the low privileged mode. The second processor 1702 is, for example, implemented as the second processor 102 of Embodiment 1 (see FIG. 1).

The memory 1703 is connected to the first processor 1701 and to the second processor 1702. The memory 1703 is, for example, implemented as the ROM 104 and the RAM 105 of Embodiment 1 (see FIG. 1).

The execution state storage region 1711 is a region for storing execution state information on the execution state of a processor. The execution state storage region 1711 is, for example, implemented as the register storage region 343, the first OS context memory region 361, the second OS context memory region 362, and the third OS context memory region 363 in Embodiment 1 (see FIG. 3).

The operating system 1712 is an operating system executed in the low privileged mode. The operating system 1712 is, for example, implemented as the first OS 321, the second OS 322, or the third OS 323 of Embodiment 1 (see FIG. 3).

The hypervisor 1713 runs on the first processor 1701 in the high privileged mode. The hypervisor 1713 causes the first processor 1701 to perform processing for switching the operating system by saving and restoring execution state information in the execution state storage region 1711, and to provide the second processor 1702 with restoration notification based on the execution state information saved in the execution state storage region 1711. The hypervisor 1713 is, for example, implemented as the hypervisor 351 of Embodiment 1 (see FIG. 3).

The restoration program 1714 runs in the low privileged mode on the second processor 1702. The restoration program 1714 causes the second processor 1702 to restore the execution state information stored in the execution state storage region 1711 to the execution state information of the second processor 1702 upon receipt by the second processor 1702 of the restoration notification. The restoration program 1714 is, for example, implemented as the restoration module 341 of Embodiment 1.

(b) The execution state storage region may include a first execution state storage region accessible by the first processor in the high privileged mode and not accessible by the first processor and by the second processor in the low privileged mode; and a second execution state storage region accessible by the second processor in the low privileged mode. The hypervisor may cause the first processor to save and restore the execution state information using the first execution state storage region and, when a processor change condition for executing a currently suspended operating system on the second processor is satisfied, write the execution state information saved in the first execution state storage region for the currently suspended operating system into the second execution state storage region. The restoration program may cause the second processor to restore the execution state information stored in the second execution state storage region to the execution state information of the second processor.

This structure prevents access by a processor in the low privileged mode to the execution state information used during the processing for switching the operating system.

(c) The hypervisor may include an execution suspension unit configured to suspend an operating system running on the first processor when commands to be executed by the first processor include a call for processing that requires execution in the high privileged mode of the second processor. The processor change condition may be that an operating system running on the first processor is suspended by the execution suspension unit.

When commands to be executed by the first processor include processing that requires execution in the high privileged mode of the second processor, this structure allows the processing to be targeted for execution on the second processor.

(d) The one or more operating systems may comprise a plurality of operating systems. Each of the operating systems may include a wait state setting unit configured to, when the operating system is running on the second processor, cause the second processor to save the execution state information of the second processor in the second execution state storage region and to enter a wait state when an OS suspension condition for suspending the operating system is satisfied.

When an operating system running on the second processor needs to be suspended, this structure allows for suspension of the operating system.

(e) The virtual machine system may further comprise an interrupt controller. Each of the operating systems may include an interrupt notification unit configured to cause the second processor to notify the first processor of a duplication notification interrupt via the interrupt controller when the OS suspension condition is satisfied and an OS restart condition for executing the operating system on the first processor is also satisfied. The hypervisor may include a writing unit configured to, when the first processor is notified of the duplication notification interrupt, cause the first processor to write the execution state information saved in the second execution state storage region into the first execution state storage region.

When an operating system running on the second processor needs to be executed on the first processor, this structure allows for the operating system to be executed on the first processor.

(f) The second execution state storage region may include an OS execution state storage region for each of the operating systems. The hypervisor may write the execution state information into the second execution state storage region when the processor change condition is satisfied by writing the execution state information into the OS execution state storage region corresponding to the operating system that corresponds to the execution state information to be written. The wait state setting unit may write the execution state information in the second execution state storage region when the OS suspension condition is satisfied by writing the execution state information into the OS execution state storage region corresponding to the operating system that corresponds to the execution state information to be written. The writing unit may cause the first processor to write the execution state information into the first execution state storage region when the first processor is notified of the duplication notification interrupt by writing the execution state information saved in the OS execution state storage region corresponding to the operating system that corresponds to the execution state information to be written.

This structure allows for mutually independent setting of processor register values corresponding to the plurality of operating systems.

(g) Upon receiving the restoration notification in the wait state, the second processor may cancel the wait state and execute the restoration program.

This structure allows the second processor to execute the restoration program upon receiving a restoration notification interrupt, even if the second processor is in the wait state.

(h) The memory may include an address storage region accessible by the processor in the low privileged mode. The hypervisor may include an address setting unit configured to cause the first processor to store an execution starting address of the restoration program in the address storage region when the hypervisor causes the first processor to write the execution state information saved in the first execution state storage region into the second execution state storage region. The second processor may execute the restoration program by referring to the execution starting address stored in the address storage region.

This structure allows the second processor to refer to the address set in the address storage region in order to execute the restoration program.

(i) The restoration program may be implemented as a portion of one of the operating systems executed by the virtual machine system. A region of the memory storing the restoration program may be included in a region storing the one of the operating systems.

This structure allows for the setting of a restoration program storageregion in a portion of the operating system storage region.

(j) The execution state information stored in the execution state storage region may be a register value.

This structure allows for generation of the execution state information stored in the execution state storage region by reading register values from the register.

INDUSTRIAL APPLICABILITY

The present invention can be widely used in a virtual machine system having a plurality of processors.

REFERENCE SIGNS LIST 100 virtual machine system
110 multiprocessor LSI
101 first processor
102 second processor
103 interrupt controller
104 ROM
105 RAM
109 timer
210 hypervisor/secure mode
220 supervisor mode
230 user mode
321 first OS
322 second OS
323 third OS
331 state save module
332 interrupt notification module
333 wait processing module
341 restoration module
342 restart pointer storage region
343 register storage region
351 hypervisor
352 OS switching module
353 OS management module
354 context updating module
361 first OS context memory region
362 second OS context memory region
363 third OS context memory region
370 secure module

The invention claimed is:

1. A virtual machine system comprising:
a memory including an execution state storage region for storing execution state information on an execution state of a processor;
a first processor and a second processor each connected to the memory and provided with a low privileged mode and a high privileged mode higher than the low privileged mode;
one or more operating systems running in the low privileged mode on a processor;
a hypervisor, running in the high privileged mode on the first processor, that causes the first processor to perform processing for switching the operating system by saving and restoring execution state information in the execution state storage region, and provides the second processor with restoration notification based on the execution state information saved in the execution state storage region; and
a restoration program, running in the low privileged mode on the second processor, that causes the second processor to restore the execution state information stored in the execution state storage region to the execution state information of the second processor upon receipt by the second processor of the restoration notification,
wherein
the execution state storage region includes
a first execution state storage region accessible by the first processor in the high privileged mode and not accessible by the first processor and by the second processor in the low privileged mode; and
a second execution state storage region accessible by the second processor in the low privileged mode,
the hypervisor causes the first processor to save and restore the execution state information using the first execution state storage region and, when a processor change condition for executing a currently suspended operating system on the second processor is satisfied, writes the execution state information saved in the first execution state storage region for the currently suspended operating system into the second execution state storage region, and the restoration program causes the second processor to restore the execution state information stored in the second execution state storage region to the execution state information of the second processor.

2. The virtual machine system of claim 1, wherein
the hypervisor includes an execution suspension unit that suspends an operating system running on the first processor when commands to be executed by the first processor include a call for processing that requires execution in the high privileged mode of the second processor, and the processor change condition is that an operating system running on the first processor is suspended by the execution suspension unit.

3. The virtual machine system of claim 2, wherein
the one or more operating systems comprise a plurality of operating systems, and each of the operating systems includes a wait state setting unit that, when the operating system is running on the second processor, causes the second processor to save the execution state information of the second processor in the second execution state storage region and to enter a wait state when an OS suspension condition for suspending the operating system is satisfied.

4. The virtual machine system of claim 3, further comprising:

an interrupt controller, wherein each of the operating systems includes an interrupt notification unit that causes the second processor to notify the first processor of a duplication notification interrupt via the interrupt controller when the OS suspension condition is satisfied and an OS restart condition for executing the operating system on the first processor is also satisfied, and the hypervisor includes a writing unit that, when the first processor is notified of the duplication notification interrupt, causes the first processor to write the execution state information saved in the second execution state storage region into the first execution state storage region.

5. The virtual machine system of claim 4, wherein
the second execution state storage region includes an OS execution state storage region for each of the operating systems, the hypervisor writes the execution state information into the second execution state storage region when the processor change condition is satisfied by writing the execution state information into the OS execution state storage region corresponding to the operating system that corresponds to the execution state information to be written, the wait state setting unit writes the execution state information in the second execution state storage region when the OS suspension condition is satisfied by writing the execution state information into the OS execution state storage region corresponding to the operating system that corresponds to the execution state information to be written, and the writing unit causes the first processor to write the execution state information into the first execution state storage region when the first processor is notified of the duplication notification interrupt by writing the execution state information saved in the OS execution state storage region corresponding to the operating system that corresponds to the execution state information to be written.

6. The virtual machine system of claim 4, wherein
upon receiving the restoration notification in the wait state, the second processor cancels the wait state and executes the restoration program.

7. The virtual machine system of claim 4, wherein
the memory includes an address storage region accessible by the processor in the low privileged mode, the hypervisor includes an address setting unit that causes the first processor to store an execution starting address of the restoration program in the address storage region when the hypervisor causes the first processor to write the execution state information saved in the first execution state storage region into the second execution state storage region, and the second processor executes the restoration program by referring to the execution starting address stored in the address storage region.

8. The virtual machine system of claim 4, wherein
the restoration program is implemented as a portion of one of the operating systems executed by the virtual machine system, and a region of the memory storing the restoration program is included in a region storing the one of the operating systems.

9. The virtual machine system of claim 1, wherein
the execution state information stored in the execution state storage region is a register value.

10. A virtual machine system control method for controlling a virtual machine system provided with a memory and with a first processor and a second processor each connected to the memory, the first processor and the second processor each provided with a low privileged mode and a high privileged mode higher than the low privileged mode, and the memory including an execution state storage region for storing execution state information on an execution state of a processor, the virtual machine system control method comprising:

a hypervisor step of, in the high privileged mode on the first processor, causing the first processor to perform processing for switching an operating system by saving and restoring execution state information in the execution state storage region, and providing the second processor with restoration notification based on the execution state information saved in the execution state storage region; and a restoration step of, in the low privileged mode on the second processor, causing the second processor to restore the execution state information stored in the execution state storage region to the execution state information of the second processor upon receipt by the second processor of the restoration notification, wherein the execution state storage region includes
a first execution state storage region accessible by the first processor in the high privileged mode and not accessible by the first processor and by the second processor in the low privileged mode; and a second execution state storage region accessible by the second processor in the low privileged mode, the hypervisor step includes causing the first processor to save and restore the execution state information using the first execution state storage region and, when a processor change condition for executing a currently suspended operating system on the second processor is satisfied, writing the execution state information saved in the first execution state storage region for the currently suspended operating system into the second execution state storage region, and the restoration step includes causing the second processor to restore the execution state information stored in the second execution state storage region to the execution state information of the second processor.

\* \* \* \* \*